United States Patent [19]

Spinelli et al.

[11] Patent Number: 5,314,960
[45] Date of Patent: * May 24, 1994

[54] SILICONE-CONTAINING POLYMERS, OXYGEN PERMEABLE HYDROPHILIC CONTACT LENSES AND METHODS FOR MAKING THESE LENSES AND TREATING PATIENTS WITH VISUAL IMPAIRMENT

[75] Inventors: Harry J. Spinelli, Wilmington; Waifong L. Anton, Claymont, both of Del.; Leonard Seidner; Henry D. Coleman, both of Brooklyn, N.Y.; Mohammed I. Ali, Aberdeen; Lester Weintraub, Mount Laurel, both of N.J.; Paul White, Winthrop, Mass.

[73] Assignee: Permeable Technologies, Inc., Morganville, N.J.

[*] Notice: The portion of the term of this patent subsequent to Sep. 14, 2010 has been disclaimed.

[21] Appl. No.: 773,714

[22] Filed: Oct. 9, 1991

Related U.S. Application Data

[63] Continuation-in-part of Ser. No. 595,512, Oct. 11, 1990, abandoned, and a continuation-in-part of Ser. No. 507,613, Apr. 10, 1990, Pat. No. 5,284,981.

[51] Int. Cl.$^5$ .................. C08F 271/02; C08F 275/00; C08F 293/00
[52] U.S. Cl. .................................. 525/280; 525/281; 525/288; 525/299; 525/301; 525/303
[58] Field of Search ............... 525/288, 293, 299, 301, 525/303, 280, 281; 526/279

[56] References Cited

U.S. PATENT DOCUMENTS

Re. 314,406 10/1983 Gaylord ........................... 526/279
3,228,741 1/1966 Becker .

(List continued on next page.)

FOREIGN PATENT DOCUMENTS

| | | |
|---|---|---|
| 0108886 | 5/1984 | European Pat. Off. . |
| 0258065 | 2/1988 | European Pat. Off. . |
| 329329 | 8/1989 | European Pat. Off. . |
| 0361929 | 4/1990 | European Pat. Off. . |
| 0406161 | 1/1991 | European Pat. Off. . |
| 0420686 | 4/1991 | European Pat. Off. . |
| 0422805 | 4/1991 | European Pat. Off. . |
| 0452097 | 10/1991 | European Pat. Off. . |
| 0452098 | 10/1991 | European Pat. Off. . |
| 64-004640 | 1/1985 | Japan . |
| 63-291925 | 12/1988 | Japan . |
| 805373 | 12/1985 | PCT Int'l Appl. . |
| 1419669 | 12/1975 | United Kingdom . |

OTHER PUBLICATIONS

R. L. Merker and J. E. Noll, *Journal of Organic Chemistry*, 21, 1537 (1956).
Andrianov et al., *Bu. Acad. of Science USSR Chem.*, 4, 467 (1957).
English Translation of JP63-291925.
English Translation of JP64-004640.

*Primary Examiner*—Ralph H. Dean
*Attorney, Agent, or Firm*—Henry D. Coleman; R. Neil Sudol

[57] ABSTRACT

The present invention relates to novel copolymers and contact lenses made from these copolymers comprising preformed silicone-containing acrylic star polymers, graft copolymers and macromonomers, preparation of these contact lenses and a therapeutic method for treating patients with visual impairment.

Described is a composition comprising at least about 10% by weight of a preformed silicone-containing acrylic copolymer and no more than about 90% by weight of a matrix formed from the random polymerization of a mixture of monomers. The mixture of monomers comprises at least one hydrophilic monomer and optionally, monomers selected from the group consisting of silicone acrylates, esters of alpha, beta-unsaturated acids and crosslinking monomers. The preformed silicone-containing acrylic copolymer is preferably copolymerized throughout the matrix. The final compositions are hydrated to a final water content of at least about 10% by weight.

47 Claims, 3 Drawing Sheets

U.S. PATENT DOCUMENTS

| | | | |
|---|---|---|---|
| 3,786,116 | 1/1974 | Milkovich et al. | |
| 3,808,178 | 4/1974 | Gaylord. | |
| 3,808,179 | 4/1974 | Gaylord. | |
| 3,878,263 | 4/1975 | Martin. | |
| 3,950,315 | 4/1976 | Cleaver. | |
| 4,120,570 | 10/1978 | Gaylord | 351/40 |
| 4,139,513 | 2/1979 | Tanaka et al. | |
| 4,152,508 | 5/1979 | Ellis et al. | 526/279 |
| 4,153,641 | 5/1979 | Deichert. | |
| 4,182,822 | 1/1980 | Chang | 526/764 |
| 4,189,546 | 2/1980 | Deichert | 528/26 |
| 4,195,030 | 3/1980 | Deichert et al. | |
| 4,208,506 | 6/1980 | Deichert | 528/32 |
| 4,245,069 | 1/1981 | Covington | 525/479 |
| 4,248,989 | 2/1981 | Novicky | 526/264 |
| 4,254,248 | 3/1981 | Friends et al. | 526/279 |
| 4,276,402 | 6/1981 | Chromacek et al. | 526/264 |
| 4,277,595 | 7/1981 | Deichert | 528/26 |
| 4,304,881 | 12/1981 | Aoki et al. | 525/66 |
| 4,414,372 | 11/1983 | Farnham et al. | 526/290 |
| 4,417,034 | 11/1983 | Webster | 526/190 |
| 4,486,577 | 12/1984 | Mueller et al. | 525/474 |
| 4,508,880 | 4/1985 | Webster | 526/190 |
| 4,508,884 | 4/1985 | Wittmann et al. | 526/275 |
| 4,524,196 | 6/1985 | Farnham et al. | 526/290 |
| 4,525,563 | 6/1985 | Shibata et al. | 526/279 |
| 4,582,884 | 4/1986 | Ratkowski et al. | 526/279 |
| 4,605,712 | 8/1986 | Mueller et al. | 525/474 |
| 4,632,968 | 12/1986 | Yokota et al. | 526/279 |
| 4,633,003 | 12/1986 | Falcetta | 556/419 |
| 4,640,941 | 2/1987 | Park et al. | 522/107 |
| 4,649,184 | 3/1987 | Yoshikawa et al. | 526/279 |
| 4,656,233 | 4/1987 | Hertler et al. | 526/190 |
| 4,659,782 | 4/1987 | Spinelli | 525/293 |
| 4,659,783 | 4/1987 | Spinelli | 525/293 |
| 4,661,573 | 4/1987 | Ratkowski et al. | 526/245 |
| 4,681,918 | 7/1987 | Webster | 525/282 |
| 4,695,607 | 9/1987 | Spinelli | 525/272 |
| 4,711,942 | 12/1987 | Webster | 526/185 |
| 4,740,533 | 4/1988 | Su et al. | 523/106 |
| 4,780,488 | 10/1988 | Su et al. | 523/106 |
| 4,791,181 | 12/1988 | Pickering et al. | 526/190 |
| 4,794,144 | 12/1988 | Spinelli | 525/284 |
| 4,806,605 | 2/1989 | Hertler | 526/190 |
| 4,810,756 | 3/1989 | Spinelli | 525/293 |
| 4,847,328 | 7/1989 | Hutchins et al. | 525/107 |
| 4,857,606 | 8/1989 | Su et al. | 525/455 |
| 5,019,628 | 5/1991 | Spinelli et al. | 525/288 |
| 5,057,576 | 10/1991 | Spinelli et al. | 525/263 |
| 5,057,578 | 10/1991 | Spinelli et al. | 525/278 | phenyltetraethyldisiloxanylethyl methacrylate triphenyldimethyldisiloxanylmethyl acrylate isobutylhexamethyltrisiloxanylmethyl methacrylate methyldi(trimethylsiloxy)-methacryloxymethylsilane n-propyloctamethyltetrasiloxanylpropyl methacrylate pentamethyldi(trimethylsiloxy)-acryloxymethylsilane t-butyltetramethyldisiloxanylethyl acrylate n-pentylhexamethyltrisiloxanylmethyl methacrylate tri-i-propyltetramethyltrisiloxanylethyl acrylate pentamethyldisiloxanylmethyl methacrylate heptamethyltrisiloxanylethyl acrylate tris(trimethylsiloxy)-gamma-methacryloxypropylsilane phenyltetramethyldisiloxanylethyl acrylate

SILICONE-CONTAINING POLYMERS, OXYGEN PERMEABLE HYDROPHILIC CONTACT LENSES AND METHODS FOR MAKING THESE LENSES AND TREATING PATIENTS WITH VISUAL IMPAIRMENT

This application is a continuation-in-part application of U.S. patent application Ser. No. 595,512, entitled "Novel Silicone-Containing Contact Lens Polymers, Oxygen Permeable Contact Lenses and Methods for Making These Lenses and Treating Patients with Visual Impairment, filed Oct. 11, 1990 now abandoned, and is also a continuation-in-part application of U.S. patent application Ser. No. 507,613, entitled "Novel Silicone-Containing Contact Lens Polymers, Oxygen Permeable Contact Lenses and Methods for Making These Lenses and Treating Patients With Visual Impairment", filed Apr. 10, 1990 now U.S. Pat. No. 5,284,981.

FIELD OF THE INVENTION

The present invention relates to novel silicone-containing polymers, oxygen permeable hydrophilic contact lenses comprising silicone-containing acrylic star polymers, graft copolymers and macromonomers, preparation of these copolymers, hydrophilic contact lens copolymers and contact lenses made from these copolymers and a therapeutic method for treating patients with visual impairment.

BACKGROUND OF THE INVENTION

Walter E. Becker, in U.S. Pat. No. 3,228,741 (1966), discloses polysiloxane polymers for use in elastomeric contact lenses exhibiting exceptionally high oxygen permeability.

Charles S. Cleaver, in U.S. Pat. No. 3,981,798 (1976), discloses random copolymers produced from the copolymerization of perfluoroalkyl alkyl methacrylates or fluorine-containing telomer alcohol methacrylates and methylmethacrylate for use in rigid gas permeable contact lenses.

N. E. Gaylord, in U.S. Pat. No. 3,808,178 (1974) and Re 31,406 (1983), discloses random copolymers of polysiloxanyl acrylates and alkyl acrylic esters made by free radical polymerization for use in contact lenses.

N. E. Gaylord, in U.S. Pat. No. 4,120,570 (1978), describes a method for treating patients with visual defects by fitting them with rigid gas permeable contact lenses made from random copolymers of polysiloxanyl acrylates and alkyl acrylic esters.

N. E. Gaylord, in U.S. Pat. No. 3,808,179 (1974) discloses random copolymers produced from the copolymerization of fluoroacrylates and esters of acrylic acid and methacrylic acid for use in rigid gas permeable contact lenses.

K. A. Andrianov, et al., Bull. Acad. Sci., USSR Chem., No. 4, pp 467–472 (1957) describes the synthesis and polymerization of Organosilicone Compounds containing a methacrylol group.

R. L. Merker, et al., *Journal of Organic Chemistry*, 21, 1537 (1956) describes the synthesis and physical characteristics of copolymers of silicone acrylates and methyl methacrylate.

E. J. Ellis et al., in U.S. Pat. No. 4,152,508 (1979), discloses copolymers of siloxanyl alkyl acrylates, an itaconate ester, and an ester of acrylic or methacrylic acid. The copolymers preferably include a cross linking agent and a hydrophilic monomer.

E. R. Martin, in U.S. Pat. No. 3,878,263 (1975), discloses polysiloxane polymers obtained by equilibrating a mixture containing an acrylate-functional silane or siloxanes and a cyclic organopolysiloxane in the presence of a base catalyst and an aprotic solvent.

G. D. Friends et al., in U.S. Pat. No. 4,254,248 (1981), disclose copolymers prepared from monomeric polysiloxanes endcapped with activated double bonds and polycyclic esters of acrylic or methacrylic acid.

W. S. Covington, in U.S. Pat. No. 4,245,069 (1981), discloses copolymers and terpolymers of an addition cross-linked polysiloxane and one or more acrylic or methacrylic esters of certain hydroxy or alkoxy alcohols.

W. G. Deichert et al., in U.S. Pat. No. 4,189,546 (1980), disclose crosslinked networks prepared from a poly(organosiloxane) monomer alpha, omega-terminally bonded through divalent hydrocarbon groups to free radical-polymerizable unsaturated groups. Homopolymers and copolymers are disclosed.

Deichert, in U.S. Pat. Nos. 4,153,641, 4,189,546, 4,208,506 and 4,277,595, disclose monomeric polysiloxanes end-capped with activated unsaturated groups which are copolymerized with acrylic acid and other monomers to form hydrophilic contact lens materials.

Mueller, et al., in U.S. Pat. No. 4,605,712, disclose a contact lens copolymer containing polysiloxanes of uniform molecular weight containing a vinyl group connected to intervening alkylene urea or urethane linkages.

Mueller, et al., in U.S. Pat. No. 4,486,577, disclose contact lens copolymers comprising polysilozanes containing at least two terminal or pendant polymerizable vinyl groups.

Anan, et al., in U.S. Pat. No. 4,933,406, disclose a contact lens article which is obtained by copolymerizing a silicone-containing monomer of defined structure, a fluorine-containing compound of defined structure and a polymerizable vinyl monomer.

Culberson, et al., in U.S. Pat. No. 4,977,229, disclose contact lens copolymers formed by copolymerizing a siloxane-containing monomer and other monomers.

Nakashima, et al., in U.S Patent 4,814,402, disclose a contact lens material comprised of N-vinylpyrrolidone, methacrylic acid and a silicone-containing (meth)acrylate.

A. Aoki et al., in U.S. Pat. No. 4,304,881 (1981), disclose the preparation of styrene/butadiene "living" polymers by anionic polymerization and coupling of these polymers by reaction with silicone tetrachloride to produce a 4-arm star polymer having a silicone atom as a core.

Yoshioka, in U.S. Pat. No. 4,990,561, disclose a wax composition prepared by polymerizing a mixture of a methylpolysiloxane(meth)acrylate compound containing one (meth) acryl group and three or more methylsiloxy groups with one or more vinyl monomer(s) to produce a copolymer which is copolymerized with an organic wax.

0. W. Webster, in U.S. Pat. Nos. 4,417,034 (1983) and 4,508,880 (1985) and W. B. Farnham and D. Y. Sogah in U.S. Patents 4,414,372 (1983) and 4,524,196 (1985) disclose the preparation of acrylic star polymers using group transfer polymerization by coupling "living" polymer with a capping agent having more than one reactive site or by initiating polymerization with an initiator which can initiate more than one polymer chain. Initiators that could produce acrylic star polymers with up to 4 arms were demonstrated.

H. J. Spinelli, in U.S. Pat. No.s 4,659,782 and 4,659,783 issued (1987), teaches the preparation of acrylic star polymers with crosslinked cores and at least 5 arms, optionally having functional groups in the cores and/or the arms. Group transfer polymerization being preferably used to make the polymers is disclosed.

As is true for most bio-medical applications, polymers that are to be used in contact lens applications have very demanding requirements placed on them. For example, rigid gas permeable contact lenses, like other contact lenses, not only must be hard and machineable, but also highly oxygen permeable. In addition, these lenses must be comfortable to wear. Furthermore, these contact lenses should have the characteristics of good flex resistance, adequate wettability and non-adherence to the eye. It is also important that the lenses maintain their shape after extended use. Finally, the lenses should be resistant to deposits of proteins, lipids, and bacteria.

In the case of soft contact lenses, these should be oxygen permeable, drapeable, wettable, durable, have adequate "toughness" or tear-strength, clarity and resistance to deposits of proteins, lipids and bacteria.

Initially, contact lenses were made from polymethylmethacrylate (PMMA), a hard, easily machineable polymer. These lenses were reasonably comfortable to wear but were not sufficiently permeable to oxygen. Consequently, they could be worn only for limited periods of time. Wearing such lenses for prolonged periods of time sometimes resulted in serious eye damage.

The next generation of lenses were the soft lenses made from polyhydroxyethylmethacrylate (PHEMA) containing high concentrations of water. These hydrogels transport more oxygen than does PMMA because the polymers accommodate large concentrations of water, but the lenses are difficult to manufacture and handle because of their softness. The increased oxygen transport is associated with the solubility of oxygen in water rather than to the polymer per se. In order to increase permeability of soft contact lenses, attempts have been made to increase the water content of these lenses. However, an increase in water content has two disadvantages; the first is that with increasing water content the lenses tend to become less resistant to tearing; the second is that high water contact lenses tend to dehydrate rapidly when made thin. In addition to the above-described deficiencies as well as the fact that the lenses may be too soft and difficult to handle (deformable), the hydrogel soft contact lenses are very susceptible to deposits and lack tear resistance.

The most recent generation of lenses, the rigid, oxygen-permeable lenses, are made from random copolymers of silicone acrylates and methylmethacrylates such as TRIS(trimethylsiloxy)-3-methacryloxypropylsilane (TRIS) and methyl methacrylate. These lenses have a significantly higher oxygen permeability than lenses made from either PMMA or hydrogels. Lenses made from TRIS homopolymer have very high oxygen permeability but they are soft, lack wettability, do not resist deposits well, and are very uncomfortable to wear. Using TRIS copolymerized with methyl methacrylate increases the durability and machinability, but there is a trade-off in other properties, most notably the oxygen permeability. The manufacturer can provide lenses with high silicone content that can be worn for extended periods of time but are very difficult to make or harder lenses with relatively high methyl methacrylate content that are more easily machineable but have reduced oxygen permeability.

Other monomers that have been used in making contact lenses often improve one property at the expense of others. For example, hexafluorobutyl methacrylate (HFBMA) gives excellent resistance to deposits but is less oxygen permeable than are the silicone acrylates. Lenses made from dimethylsilicone elastomers (polydimethylsiloxane—PDMS) have very high oxygen permeability but are very soft, and difficult to manufacture, extremely nonwettable, and very uncomfortable to wear.

One of the current processes for making materials for contact lenses involves the bulk free radical copolymerization of an alkyl (meth)acrylate, for example methyl methacrylate, with a polysiloxanylalkyl ester of acrylate or methacrylate (silicone acrylate), among others, for example TRIS, and an amount of a polyfunctional monomer, such as ethyleneglycol dimethacrylate, to provide rigidity through crosslinking. As mentioned above, there results a trade-off in properties depending upon the relative proportions of the monomers used. It was originally believed that lens materials having high oxygen permeability and improved hardness and machinability could be made by incorporating a hard polymer such as PMMA in the bulk polymerization of a silicone acrylate with an alkyl acrylic ester. It has been found, however, that PMMA is not soluble in silicone acrylate monomers nor in their mixtures with alkyl acrylic esters; nor has it been possible to incorporate PMMA in the highly oxygen permeable dimethylsilicone elastomers.

Conventional soft contact lenses may be made by first polymerizing hydrophilic monomers, such as hydroxyethyl methacrylate (HEMA), glycerolmethacrylate (GMA), methacrylic acid (MAC) and N-Vinyl pyrrolidinone (NVP or VP), among others into a rigid "button", then lathing the button into a contact lens, which is finally hydrated into a finished product. Alternatively, these lenses may be cast-molded to produce semi-finished or completely finished lenses. Although the key properties of a soft contact lens are oxygen permeability, drapeability, deposit resistance and "toughness", conventional soft contact lenses have been quite limited in their ability to maximize all of these key properties. As in the case of rigid gas permeable contact lenses, trade-offs exist in soft contact lenses as well.

For example, the hydrophilic monomers which are normally used to make soft contact lenses are not oxygen permeable, and consequently soft contact lenses have had to rely strictly on water content to provide oxygen permeability. The more water that is present in a soft contact lens, the greater is the oxygen permeability. For example, contact lenses having water contents of less than about 40% tend to have low oxygen permeabilities ($Dk < 15 \times 10^{-11}$), whereas contact lenses having water contents approaching 75% have higher permeabilities ($Dk$ approximately $35 \times 10^{-11}$). Although increasing the amount of water in a contact lens is an obvious way to increase the oxygen permeability in a contact lens, conventional contact lenses are limited in the amount of water that can be present or in the thickness of the lens. Attempts to increase water content to levels above about 40% or higher have resulted in dramatic losses in "toughness" or tear strength, greater susceptibility to cuts and tears and handling difficulties because of the flimsiness of the lenses. To compensate for the absence of "toughness" in high water content lenses, these lenses have had to be made thicker than many conventional lenses. However, this approach has resulted in a decrease in oxygen transmissibility (Dk/L) which is directly related to the amount of oxygen that reaches the cornea.

At present, the primary limitation in commercial soft contact lenses is their inability to provide adequate oxygen transmissbility to the cornea. This deficiency in the present practice may produce deleterious effects such as edema, corneal ulcers and related conditions. There is a clear need in the art to provide contact lenses with increased oxygen permeability without compromising drapeability, wettability, durability, "toughness" or tear-strength, clarity and resistance to deposits of proteins, lipids and bacteria.

Surprisingly, preformed macromonomers, graft copolymers and star polymers of the present invention can be used to enhance the characteristics of hard and soft contact lenses. These preformed acrylic macromonomers, graft copolymers and star polymers may be dissolved or dispersed in silicone acrylate monomers, wetting monomers such as hydroxyethylmethacrylate, glycerol methacrylate, polyvinyl alcohols, polyvinylpyrrolidone and methacrylic acid, among others, and/or mixtures of such monomers with alkyl acrylic esters. The copolymers of the present invention may be adapted for use in hard, flexible or soft contact lenses. It has been found that bulk polymerization of these mixtures gives products with attractive properties including optical clarity, suitable hardness (in the case of buttons for lathing soft contact lenses), suitable drapeability and wettability (in the case of soft contact lenses) and enhanced oxygen permeability.

OBJECT OF THE PRESENT INVENTION

It is an object of the present invention to provide novel polymer compositions which can be used to make soft gas permeable contact lenses having water contents of at least about 10% by weight.

It is another object of the present invention to provide methods for improving the oxygen permeability, durability and/or machinability of copolymers which can be used to make contact lenses.

It is an additional object of the present invention to provide methods for improving the oxygen permeability and "toughness" or tear resistance of soft contact lens copolymers without dramatically impacting other key characteristics of soft contact lenses.

It is still a further object of the present invention to provide wettable copolymers according to the present invention which can be used to produce soft lenses having water contents of at least about 10% by weight.

It is yet another object of the present invention to provide oxygen-permeable, wettable, transparent copolymers which can be cast, molded or machined to provide improved flexible or soft contact lenses having water contents, after hydration of at least about 10%.

It is a further object of the present invention to provide methods for correcting visual defects in patients suffering from visual impairment by fitting the eyes of these patients with soft contact lenses of the present invention.

These and other objects of the present invention will be readily apparent from the description of the present invention which is set forth in detail herein.

SUMMARY OF THE INVENTION

The present invention relates to novel compositions containing macromonomers, graft polymers and acrylic star polymers dispersed or copolymerized throughout a polymer matrix and contact lenses made from these novel compositions. The novel compositions of the present invention comprise novel silicone-containing acrylic polymers which are obtained from the polymerization of preformed macromonomers, graft polymers and/or acrylic star polymers with monomers of the polymer matrix, for example, hydrophilic esters of acrylic and/or methacrylic acid ((meth)acrylates) and/or crosslinking agents, among others agents including alkyl (meth)acrylates and related (meth)acrylates, and silicone acrylate monomers and fluorine acrylate monomers, among others. These novel compositions may be used for a number of purposes including producing medical polymers such as oxygen permeable hydrated wound dresses as well as hydrated soft contact lenses having water contacts of at least about 10% by weight.

In certain embodiments according to the present invention, the compositions contain pre-formed silicone-containing macromonomers incorporated into, and preferably polymerized throughout, a substantially hydrophilic polymer matrix. Macromonomers according to the present invention are linear homopolymers, block polymers or random copolymers preferably in the form of a diblock, with a first block being substantially hydrophilic and a second block being substantially hydrophobic and permeable. The hydrophobic, permeable block generally is derived from at least about 50% by weight of silicon acrylate monomer units and preferably consists essentially of polymerized silicone acrylate. Most preferably, the hydrophobic, permeable block comprises homo-polysilicone acrylate. The macromonomers which are used in the compositions according to the present invention preferably have at least one polymerizable olefinic group at the end of the polymer chain. Numerous additional polymerizable groups may also be attached to the polymer chain.

Preferably, the macromonomers are preformed block copolymers having a first substantially hydrophilic block and a second substantially hydrophobic, permeable block. The first substantially hydrophilic block preferably is derived from at least about 25% by weight of a hydrophilic, acrylic-type monomer and the second substantially hydrophobic, permeable block is derived from at least about 50% by weight silicone acrylate monomers. Although not required, these macromonomers preferably have on average at least one polymerizable group, preferably an olefinic group which is preferably a terminal double-bond-containing organo group and is in the hydrophilic block of the macromonomer. The inclusion of at least one polymerizable group in the macromonomer results in the copolymerization of the macromonomer with the mixture of monomers which comprises the polymer matrix. The double-bond-containing organo group is generally linked to the end of the macromonomer by means of a urethane, ester, ether, amide or related linkage. In certain embodiments more than one polymerizable group is linked to the macromonomer at sites on the macromonomer which may include a terminal site. The polymerizable group may be, for example, a double bond from a methacryloxy, an acryloxy, a styrenic, an alpha methyl styrenic, an allylic, vinylic or other olefinic group.

In certain preferred embodiments, these pre-formed macromonomers comprise a first substantially hydrophilic block which is derived from at least about 25% by weight of at least one hydrophilic acrylic-type monomer. Preferred hydrophilic acrylic-type monomers for use in the present invention include hydrophilic (meth)acrylates, and (meth)acrylic acids, for example, hydroxyethylmethacrylate (HEMA), glycerolmethacrylate (GMA), methacrylic acid and acrylic acid. Other hydrophilic acrylic-type monomers well known in the art may also be used in the macromonomers according to the present invention.

The hydrophobic, permeable block of the macromonomer is derived from monomer units comprising at least about 50% by weight of at least one polysiloxanylalkyl ester (silicone acrylate) preferably having the formula

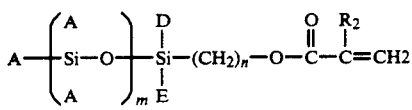

where D and E are selected from the group consisting of $C_1$–$C_5$ alkyl groups, phenyl groups, and groups of the structure

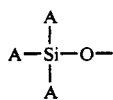

where A is selected from the group consisting of $C_1$–$C_5$ alkyl groups and phenyl groups; m is an integer from one to five except H that m is an integer from one to fifteen when A, D and E are $C_1$ alkyl groups; and n is an integer from one to three; $R_2$ is —H or —$CH_3$.

In general, the substantially hydrophilic block of the macromonomer comprises about 5% to about 95% by weight of said macromonomer and the hydrophobic, permeable block comprises about 5% to about 95% by weight of said macromonomer.

In additional aspects of the present invention, the novel polymers comprise pre-formed silicone-containing acrylic star polymers incorporated into, and preferably copolymerized throughout, a polymer matrix. In certain embodiments, these preformed star polymers are comprised of a crosslinked core derived from one or more esters of acrylic or methacrylic acid ((meth)acrylate) monomers and a plurality of linear copolymeric arms having an unattached free end attached to the core. In other emodiments the core of the acrylic star polymer may be a polysiloxane core made by the polycondensation of substituent alkoxysilyl groups contained in acrylic ester groups or acrylic block copolymers as taught in U.S. Pat. No. 5,036,139, issued July 30, 1991. The arms of the star polymer comprise a first substantially hydrophilic block and a second substantially hydrophobic, permeable block. In preferred embodiments of the star polymers according to this aspect of the present invention, the hydrophobic, permeable block is nearest the crosslinked core and the substantially hydrophilic block is furthest from the crosslinked core. Thus, the preferred star polymers comprise a crosslinked core to which are attached polymeric arms, the block of the arms nearest the crosslinked core comprise a hydrophobic, permeable block and the block of the arms furthest from the crosslinked core comprise a substantially hydrophilic block. While not being limited by way of theory, it is believed that star polymers having this preferred structure are able to compatibilize with a hydrophilic matrix and produce two distinct phases in the final composition: a substantially hydrophilic phase surrounding a separate, substantially hydrophobic, permeable phase. Preferably, prior to incorporation into the final compositions according to the present invention, these star polymers have at least one polymerizable group attached to the arms, most preferably attached to the substantially hydrophilic block of the arm.

Preferably, these star polymers comprise:

a. a crosslinked core comprising a polymer derived from a mixture of monomers comprising
i). 1–100% by weight of one or more monomers each having at least two polymerizable groups,

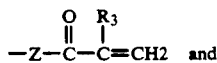

ii. about 0–99% by weight of one or more monomers, each having one group,

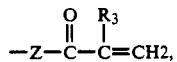

in which $R_3$ is the same or different and is H, $CH_3$, $CH_3CH_2$, CN, or COR' and Z is 0, or NR', R' is C1–C4 alkyl and b) attached to said core, at least one polymeric arm, each arm comprising a substantially hydrophilic block and a substantially hydrophobic, permeable block, said hydrophilic block comprising at least about 25% by weight of a hydrophilic acrylic-type monomer and said hydrophobic, permeable block comprising at least about 50% by weight of at least one one or more polysiloxanylalkyl ester.

In preferred embodiments according to the present invention, the polyxiloxanylalkyl ester has the formula

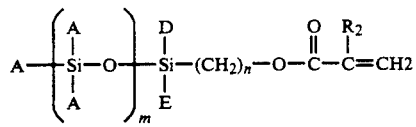

where A is selected from the class consisting of C1–C5 alkyl groups, phenyl groups, and G groups;

G is a group of the structure:

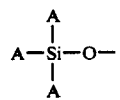

where D and E are selected from the class consisting of $C_{1-5}$alkyl groups, phenyl groups and G groups; $R_2$ is selected from the group of hydrogen and methyl; m is an integer from one to five, except that m is an integer from one to fifteen when A, D and E are $C_1$ alkyl groups and n is an integer from one to three; and the unattached ends of said arms have a terminal organo group containing a copolymerizable carbon-carbon double bond.

Preferably, in the preformed star polymers, at least 5 of the arms are present, and most preferably at least 5 of the arms have their unattached ends, preferably, the substantially hydrophilic block of the arm, terminated with an organo group containing a polymerizable carbon-carbon double (olefinic) bond. In certain cases, more than one double bond may be included on the arms of the star polymers. Such double bonds permit the preformed star polymer to copolymerize with other monomers to form the novel copolymers of the present invention. Other preferred star polymers for use in the present invention may contain between one and five polymerizable carbon-carbon double bonds preferably distributed in the hydrophilic block of the arm.

The copolymerization of the star polymer with the matrix of compositions according to the present invention results in a novel polymer with improved resistance to extraction and greater reinforcement of properties, such as toughness and machineability, in the polymer combination. In soft contact lens copolymers, enhanced oxygen permeability in addition to increased toughness of the final hydrated contact lens results from the inclusion of the pre-formed macromonomers, graft copolymers and/or star copolymers in copolymers of the present invention.

Compositions of the present invention comprise a polymer formed by the bulk polymerization of preformed macromonomers, graft copolymers and/or star polymers as described above in combination with a substantially hydrophilic matrix comprising a mixture of monomers, said monomer mixture comprising at least 25% by weight of at least one hydrophilic monomer. In certain preferred embodiments according to the present invention, the monomer mixture comprises at least 25% by weight of at least one hydrophilic monomer and at least one additional monomer selected from the group consisting of esters of alpha, beta unsaturated acids such as acrylic and methacrylic acid, among others, crosslinking agents, and mixtures thereof. In other embodiments, polysiloxanylalkyl esters of alpha, beta unsatured acids such as acrylic and methacrylic acid, as well as fluorine acrylates as described hereinbelow may also be added to the matrix.

The weight ratio of the macromonomer, graft copolymer star polymer and other monomers may be readily varied to produce the compositions according to the present invention. In general, the macromonomer, graft copolymer or star polymer comprises about 10% to as much as 98% or more by weight of the final product and the substantially hydrophilic matrix comprises about 2% to about 90% by weight of the compositions. In certain cases, it is possible to provide final compositions which are made exclusively (100% by weight) from the preformed silicone-containing acrylic copolymer. After hydration, compositions according to the present invention comprise at least about 10% by weight water.

The compositions according to the present invention find utility in a number of diverse applications including contact lenses, wound dressings, release coatings, ocular membranes, intraocular implants, sizing agents, electronics adhesives, gas and liquid separation membranes, prostheses and etching resists, among others, especially where hydrogels may be used. The compositions according to the present invention find particular utility in contact lenses.

DETAILED DESCRIPTION OF THE PRESENT INVENTION

Figure 1A:
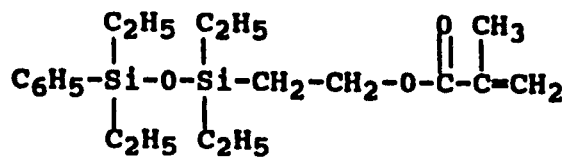
FIGS. 1A-1C sets forth the names and chemical structures of numerous exemplary silicone acrylates that may be used in the present invention.

For purposes of clarity, throughout the discussion of the present invention, the following definitions will be used:

The term "copolymer" is used throughout the specification to describe a polymer that results from the polymerization of at least two different monomers. The term copolymer includes polymers of the present invention obtained by the bulk polymerization of monomers and the macromonomers, graft copolymers and/or star polymers of the present invention.

The term "monomer" is used throughout the specification to describe chemical compounds containing at least one polymerizable double bond that are the non-preformed building blocks of the preformed polymers and compositions according to the present invention. Monomers include silicone acrylates, esters of alpha, beta-unsaturated acids including esters of acrylic and methacrylic acid ((meth)acrylates) such as methyl methacrylate, among others, fluoroacrylates, hydrophilic ("wetting") monomers, including certain acrylonitrile monomers, hydrophilic acrylic-type monomers and crosslinking monomers, among others.

The term "macromonomer" is used throughout the specification to describe preformed linear silicone-containing acrylic polymers which may be used to produce hydrated oxygen permeable compositions. The macromonomers according to the present invention preferably comprise a first substantially hydrophilic block derived from at least about 25% by weight of at least one hydrophilic acrylic-type monomer and a second substantially hydrophobic, permeable block derived from at least about 50% by weight of at least one polysiloxanylalkyl ester of an alpha, beta unsaturated ester. Preferably, the hydrophilic block of the macromonomers comprises substantially more than 25% by weight of hydrophilic acrylic-type monomer units and in certain embodiments may comprise up to 100% by weight hydrophilic acrylic-type monomer units. In certain embodiments according to the present invention, however, the hydrophobic, permeable block may comprise as much as 100% by weight of the macromonomer. The amount of hydrophilic monomer included in the hydrophilic block and the rest of the macromonomer according to the present invention is that amount which is effective to produce, in combination with a matrix, a composition comprising at least about 10% by weight water after hydration. Macromonomers according to the present invention preferably have a polymerizable group at one end of the polymer chain and are used in the contact lens polymers of the present invention. In preferred embodiments, the polymerizable group of the macromonomer may be a double bond from a methacryloxy, an acryloxy, a styrenic, an alpha methyl styrenic, an allylic, a vinylic or other olefinic group. In certain embodiments it may be advantageous for the macromonomer to contain more than one polymerizable group, most preferably with at least one of such groups at the end of the polymer chain (and generally in the hydrophilic block). It is also possible, although less preferable, to utilize a macromonomer containing an absence of polymerizable groups which is simply dispersed throughout the polymer matrix of the copolymers of the present invention. In the case of the use of macromonomers in soft, hydrated contact lenses, this approach may be less preferred because of the inability of the matrix in a hydrated soft contact lens to provide adequate structural integrity for the dispersed macromonomers. The terms "region" and "block" when describing macromonomers and other preformed polymers according to the present invention are synonymous and may be used interchangeably.

The term "star polymer" or "star copolymer" is used throughout the specification to describe high molecular weight silicone-containing polymers for use in the present invention that generally have a multitude of linear, acrylic arms radiating out from a central core. The arms are linear polymers having at least one substantially hydrophilic block preferably derived from at least about 20-25% by weight of hydrophilic acrylic-type monomers and at least one substantially hydrophobic, permeable block derived from at least 50% by weight of at least one polysiloxanylalkyl ester of an alpha, beta, unsaturated ester such as (meth)acrylic acid (silicone acrylate). The amount of hydrophilic monomer included in the hydrophilic block and the rest of the star polymer according to the present invention is that amount which is effective to produce, in combination with a matrix, a composition comprising at least about 10% by weight water after hydration. Preferably, the arms of the star polymer contain one substantially hydrophilic block and one substantially hydrophobic, permeable block. In general, the substantially hydrophilic block of the arms of the star polymer comprises about 5% to about 95% by weight of said arm and the substantially hydrophobic, permeable block comprises about 5% to about 95% by weight of said arm. In certain embodiments according to the present invention, however, the hydrophobic, permeable block may comprise as much as 100% by weight of said arm. The star polymers may have functional groups such as polymerizable double bonds, hydroxyl groups and carboxyl located at the end of the arms or distributed along the chain. In general, the cores are highly crosslinked segments of difunctional acrylates, copolymers of monofunctional and difunctional acrylates. In addition, the core of the star polymer may be a crosslinked polysiloxy core derived from a multifunctional crosslinkable silicone-containing group, such as a polyalkoxysilyl group, as described, for example in U.S. Pat. No. 5,036,139, which is incorporated by reference herein. The star polymers of the present invention may be dispersed or preferably copolymerized throughout the matrix of copolymers of the present invention.

The term "graft copolymer" is used throughout the specification to describe "branched" or "comb" copolymers which are similar to the macromonomers and star polymers according to the present invention. Graft copolymers according to the present invention are high molecular weight silicone-containing polymers for use in the present invention that generally have a number of linear, polymeric arms grafted onto a polymeric backbone. Graft copolymers according to the present invention preferably comprise at least one substantially hydrophilic block or region and one substantially hydrophobic, permeable block or region. Preferably, the backbone of the graft copolymer is comprised of a substantially hydrophilic block (generally derived from at least about 20-25% by weight of hydrophilic acrylic-type monomers) to which a number of arms is bound at varying points along the backbone. The amount of hydrophilic monomer included in the hydrophilic block and the rest of the graft copolymer according to the present invention is that amount which is effective to produce, in combination with a matrix, a composition comprising at least about 10% by weight water after hydration. In certain instances, the backbone may instead comprise a substantially hydrophobic, permeable block (even up to 100% by weight of the backbone). The arms of the graft copolymers are generally linear polymers which may be random, homo or block copolymers. The arms are preferably comprised of at least one substantially hydrophobic, permeable block and most preferably, the arms are homopolymers of monomeric units of polysiloxanylalkyl esters of alpha, beta unsaturated acids. The arms may also preferably comprise a first hydrophilic block derived from at least about 25% by weight of a hydrophilic acrylic-type monomer and at least one substantially hydrophobic, permeable block derived from at least about 50% by weight of a polysiloxanylakyl ester of an alpha, beta, unsaturated acid. In general, the substantially hydrophilic block of the graft copolymer comprises about 5% to about 95% by weight of said arm and the substantially hydrophobic, permeable block comprises about 5% to about 95% by weight of said arm. In certain embodiments according to the present invention, however, the hydrophobic, permeable block may comprise as much as 100% by weight of the arm(s). The graft copolymers may have functional groups such as polymerizable double bonds, hydroxyl groups and carboxyl located at the end of the arms or distributed along the chain. The graft copolymers of the present invention may be dispersed or preferably copolymerized throughout the matrix of copolymers of the present invention.

The terms "preformed silicone-containing acrylic copolymer", "preformed silicone-containing copolymer" and "preformed copolymer" are used throughout the specification to describe the macromonomers, graft polymers and star polymers used in the copolymers of the present invention. These macromonomers and star polymers are derived from esters of alpha, beta unsaturated acids such as hydrophilic monomers, for example hydroxyethyl methacrylate, glycerol methacrylate, polymerizable acids, for example, methacrylic and acrylic acid, non-hydrophilic esters of alpha, beta unsaturated acids such as methyl methacrylate, ethyl methacrylate, propyl methacrylate and butyl methacrylate, among others, silicone acrylates such as TRIS, among other monomers including other alpha, beta unsaturated monomers having activated polymerizable double bonds such as acrylonitriles, amoong others. These preformed copolymers preferably are derived from at least about 10% by weight silicone acrylates. In addition, these preformed copolymers are derived from an amount of a hydrophilic monomer effective, in combination with a surrounding hydrophilic matrix, to produce a hydrated composition having a water content of at least about 10% by weight. The amount of hydrophilic acrylic-type monomer included in the preformed copolymer will range from about 0% to about 90% by weight of the preformed copolymer.

The term "matrix" is used throughout the specification to describe that part of the composition that results from the random polymerization of the monomer mixture. The monomer mixture contains at least one hydrophilic monomer in an amount effective to produce, after polymerization with the preformed silicone-containing acrylic copolymers followed by hydration, a composition which contains at least about 10% by weight water. In general, the amount of hydrophilic matrix utilized in the present invention ranges from about 2% to about 90% (in certain cases, 0% to about 90%) by weight of the compositions. In addition to the inclusion of hydrophilic monomers, the monomers of the matrix may also be selected from the group consisting of silicone acrylates, esters of alpha, beta-unsaturated acids, crosslinking monomers, and mixtures thereof, among others. Of course, the amount and type of monomers other than hydrophilic monomers which may be used in the matrix will vary according to the amount and type of hydrophilic monomer utilized in the preformed silicone-containing acrylic copolymer used and the amount and type of such copolymer included in the final composition. The weight ratios of the various individual components included in the compositions according to the present invention may also vary, depending upon the final water content desired. One of ordinary skill in the art will recognize that the amount and type of individual monomers and preformed silicone-containing copolymers utilized in the present invention may be varied over a wide range. The matrix monomers are distinct from the macromonomers, graft copolymers or star polymers which are also incorporated into the compositions according to the present invention. The compositions of the present invention comprise the matrix, graft copolymer, macromonomer and/or star polymer dispersed or preferably copolymerized throughout the matrix.

The term "difunctional acrylate" is used throughout the specification to describe a chemical compound having at least two acrylate functionalities. In addition to being monomers, crosslinking monomers for use in the present invention are difunctional acrylates.

The term "silicone acrylate(s)" is used throughout the specification to describe polysiloxanylalkyl esters of alpha, beta unsaturated acids including acrylic and methacrylic acids which are included in macromonomers, graft copolymers, star polymers and the matrix of the copolymers of the present invention.

The term "(meth)acrylate(s)" is used throughout the specification to describe esters of acrylic and methacrylic acid.

The term "non-silicone ester(s)" is used throughout the specification to describe esters of alpha, beta-unsaturated acids including esters of acrylic and methacrylic acid ((meth)acryaltes) which are included in the macromonomers, star polymers and polymer matrix of the copolymers of the present invention. It is understood that the term ester of alpha, beta-unsaturated acid is exclusive of silicon acrylates and is synonymous with the term non-silicone ester. The term non-silicone esters includes non-hydrogel (non-hydrophilic) esters such as alkyl esters of (meth)acrylic acid, for example, methyl methacrylate, ethyl methacrylate, propyl methacrylate, butyl methacrylate and related esters of acrylic and methacrylic acid which do not form hydrogels when exposed to water. The term non-silicone esters also includes hydrophilic monomers such as hydroxyethyl methacrylate, glycerol methacrylate, methacrylic and acrylic acid, which may be included in the polymer matrix of soft contact lenses because of their ability to produce hydrogels after hydration.

The term "fluoro acrylate(s)" is used throughout the specification to describe fluorine containing esters of alpha, beta unsaturated acids including acrylic and methacrylic acid that may be included in the copolymers, including the macromonomer, graft copolymer, star polymers and the polymer matrix to provide structure integrity and, in certain instances, enhanced oxygen permeability.

The term "hydrophilic acrylic-type monomer" is used throughout the specification to describe hydrophilic monomers which may be incorporated into macromonomers, graft copolymers and star polymers according to the present invention. The term hydrophilic acrylic-type monomer includes hydrophilic non-silicone esters of alpha, beta unsaturated acids such as acrylic and methacrylic acid, for example, hydroxyethyl methacrylate and glycerol methacrylate as well as alpha, beta unsaturated acids, especially including methacrylic and acrylic acid. In addition, hydrophilic monomers containing an activated olefinic group (alpha, beta unsaturated monomers) similar to (meth)acrylates such as hydrophilic acrylonitriles and acrylamides, among other monomers, are also included under this term.

The term "hydrophilic monomer" is used throughout the specification to describe monomers having an affinity for water which may be incorporated into the polymer matrix of copolymers according to the present invention to provide a hydrophilic component to the matrix. The term hydrophilic monomer includes hydrophilic (hydrogel) non-silicone esters of acrylic and methacrylic acid such as hydroxyethyl methacrylate (HEMA), glycerol methacrylate and methacrylic acid (hydrophilic acrylic-type monomers) as well as other wetting monomers such as methacrylic acid and N-vinyl pyrrolidone, among numerous others.

The term "substantially hydrophilic" is used throughout the specification to describe the monomer matrix and hydrophilic blocks of the macromonomers, graft copolymers and star polymers according to the present invention. The term substantially hydrophilic, is used to describe a matrix or block which has a preference or affinity for a hydrophilic chemical environment relative to a hydrophobic environment. These substantially hydrophilic blocks or matrices generally comprise at least about 20-25% by weight of a hydrophilic acrylic-type monomer in combination with other acrylic-type monomers including alkyl esters of alpha, beta unsaturated acids and other monomers such as fluoro acrylates and silicone acrylates which are utilized in weight ratios which will maintain the substantially hydrophilic character of the block or matrix. These blocks may be random, block or homo polymers.

The term "substantially hydrophobic, permeable" is used to describe blocks of the preformed silicone-containing copolymers which have an affinity for hydrophobic chemical environments rather than hydrophilic blocks. Moreover, these blocks are substantially more permeable than polymethylmethacrylate. Substantially hydrophobic, permeable blocks generally comprise at least about 50% by weight of a silicone acrylate in combination with other acrylic-type monomers. These blocks may be random, block or homo polymers. Most preferably, this block consists essentially of homo (100%) silicone acrylate.

Compositions according to the present invention comprise a polymer comprising a macromonomer, graft copolymer and/or a star polymer preferably Copolymerized throughout a polymer matrix comprising a mixture of monomers, said mixture of monomers having sufficient hydrophilic character to provide after polymerization a composition which comprises at least about 10% by weight water after hydration. The polymer matrix may comprise one or more hydrophilic monomers or, in certain instances, at least one additional monomer selected from the group consisting of non-hydrophilic esters of alpha, beta-unsaturated acids, such as methyl methacrylate, ethyl methacrylate, propyl methacrylate, butyl and iso-butyl methacrylate, crosslinking monomers and mixtures thereof. In certain embodiments, the polymer matrix may also include at least one additional monomer such as a silicone acrylate, fluoroacrylate and mixtures thereof, among others.

In synthesizing preformed silicone-containing acrylic copolymers (macromonomers, graft copolymers and star polymers) of the present invention, generally at least 20% and preferably at least about 25% by weight hydrophilic acrylic-type monomers are used in the substantially hydrophilic block. Exemplary hydrophilic acrylic-type monomers for use in this aspect of the present invention include hydroxyethyl methacrylate, glycerol methacrylate, methacrylic and acrylic acid, among others. Virtually any hydrophilic acrylic-type monomer may be used in this aspect of the present invention. In general, the substantially hydrophilic block of the preformed silicone-containing acrylic copolymers comprises about 0% to about 90% by weight of said preformed copolymer (generally, at least about 2% by weight within this range), whereas the substantially hydrophobic, permeable block comprises at least about 10% by weight of the preformed silicone-containing acrylic copolymer and preferably at least about 20% by weight of said copolymer. In general, the substantially hydrophilic block of the preformed acrylic copolymer comprises at least about 20% by weight of at least one hydrophilic acrylic-type monomer.

The substantially hydrophilic block of the preformed acrylic copolymer may comprise, in addition to the hydrophilic acrylic-type monomer, amounts of a non-hydrophilic alpha, beta unsaturated ester. Preferably, esters of acrylic and methacrylic acid, are used. Most preferably, methyl methacrylate is used because of its relative wettability and its ability, even at relatively high weight percentages, to avoid significantly diminishing the hydrophilic character of the hydrophilic block. These non-hydrophilic alpha, beta unsaturated esters may also be used in the hydrophobic, permeable block of the preformed acrylic copolymers.

The amount of non-hydrophilic monomers chosen for use in the preformed copolymers may vary but will be chosen so as not to significantly impact the overall chemical characteristics (hydrophilic or hydrophobic, permeable) desired. It is noted that when more hydrophobic esters are chosen, the amount of ester which may be added to the hydrophilic block is relatively small and the amount of ester which may be added to the hydrophobic, permeable block may be relatively large (although there may be a significant decrease in permeability relative to a homo block of polysilicone acrylate).

Representative esters of acrylic and methacrylic acid which are used in the present invention include, for example, butyl methacrylate, sorbyl acrylate and methyacrylate; 2-(dimethylamino)ethyl methacrylate, 2-(dimethylamino)ethyl acrylate; 3,3-dimethoxypropyl acrylate; 3- methacryloxypropyl acrylate; 2-acetoxyethyl methacrylate; p-tolyl methacrylate; methylene malononitrile; ethyl 2-cyanoacrylate; N,N-dimethyl acrylamide; 4- fluorophenyl acrylate; 2-methacryloxyethyl acrylate and linoleate; propyl vinyl ketone ethyl 2-chloroacrylate; glycidyl methacrylate; 3-methoxypropyl methacrylate; 2[(1-propenyl)oxylethyl methacrylate and acrylate; phenyl acrylate; 2-(trimethyloloxy)ethyl methacrylate; allyl acrylate and methacrylate. Preferred monomers of this group include methyl methacrylate, glycidyl methacrylate; sorbyl methacrylate; ethyl acrylate, butyl acrylate; sorbyl acrylate; 2-(trimethylsiloxy)ethyl methacrylate; 2-methacryloxyethyl acrylate, 2-acetoxyethyl methacrylate; and 2-(dimethylamino)ethyl methacrylate, among others, including mixtures of these esters.

In addition to the above, esters of itaconic acid, maleic acid and fumaric acid and related polymerizable esters of alpha, beta-unsaturated acids may also be used. One of ordinary skill in the polymer arts will recognize that the particular ester chosen for use in the macromonomers, the graft copolymers, the star polymers or for the matrix of the present invention may vary depending upon the type of characteristics desired for the individual components as well as the final copolymer. One of ordinary skill in the art will also recognize that the choice of the ester will also vary according to the compatibility of the macromonomer or star polymer with the polymer matrix.

For synthesizing macromonomers, graft copolymers and star polymers according to the present invention, the amount of the ester of alpha, beta unsaturated acid (non-silicone esters) included will vary over a large range as a function of the rigidity, oxygen permeability and final water content desired as well as the composition of the polymer matrix and the compatability of the macromonomers, graft copolymers and/or star polymers within the matrix, and the total amount of silicone acrylate included in the copolymers. Esters of acrylic and methacrylic acid, especially including methyl methacrylate, among others, are preferred. In general, an ester of methacrylic or acrylic acid is included in the preformed acrylic copolymer in an amount ranging from about 1% by weight up to about 75% by weight, or higher. In the case of macromonomers to9 be used in mid to high water content soft contact lenses, non-hydrophilic acrylic monomers are included in a preferred range of about 1% to about 45% by weight and a most preferred range of about 1% to about 10% by weight. Although in certain cases the amount of such ester included in the preformed acrylic copolymer may be above or below the broadest range, practical problems related to the solubility, manufacturability and water content of the contact lenses may occur.

In the compositions of the present invention, the amount of hydrophilic monomer included in the matrix portion generally ranges from about 20% to approximately 100%, preferably at least about 25% of the final weight of the matrix, the matrix portion of the compositions ranging from about 0% to about 90% by weight, preferably at least about 2% by weight.

The preformed silicone-containing acrylic copolymers of the present invention also contain a silicone acrylate monomer in the hydrophobic, permeable block of the copolymer in quantities sufficient to provide significantly enhanced oxygen permeability relative to PMMA. In general, the silicone acrylate monomer in the hydrophobic, permeable block comprises at least about 50% by weight of the block and more preferably, at least about 80% by weight of the block. In certain particularly preferred embodiments for use in highly oxygen permeable soft contact lenses, the amount of silicone acrylate approaches 100% by weight of the hydrophobic, permeable block of the preformed copolymer.

Figure 1A:
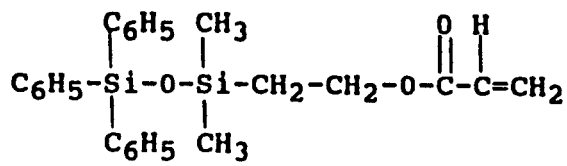
Figure 1A:
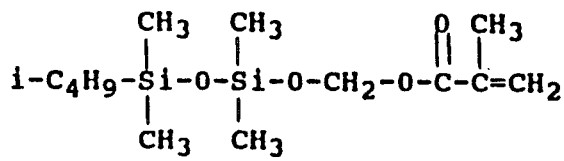
Figure 1A:
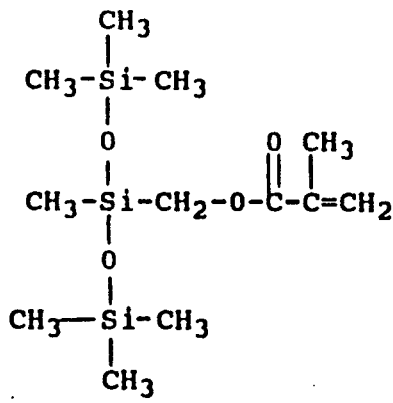
Figure 1A:
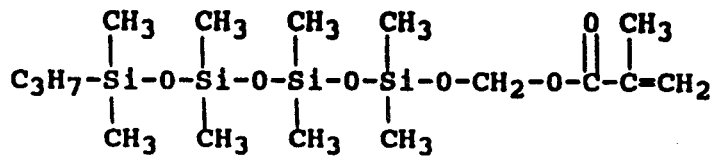
Figure 1B:
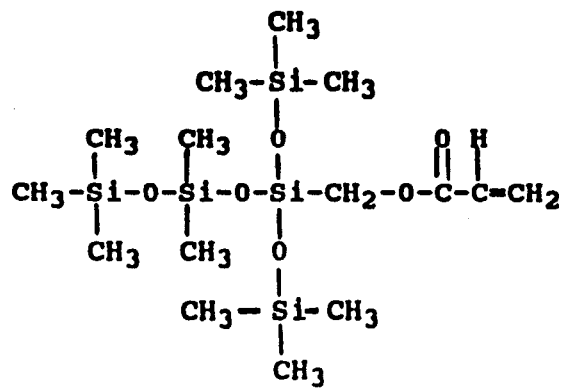
Figure 1B:
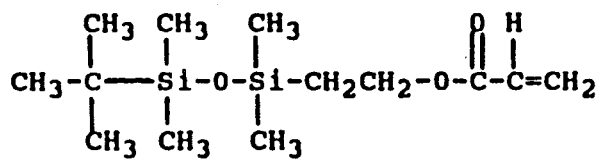
Figure 1B:
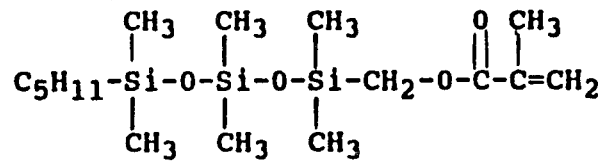
Figure 1B:
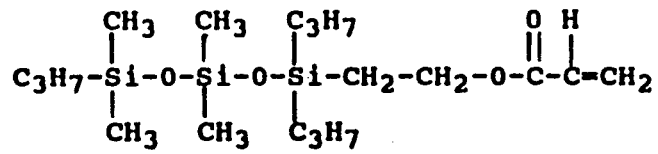
Figure 1B:
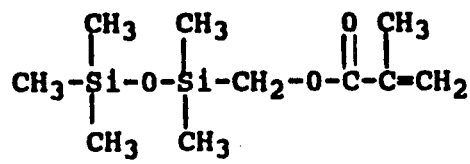
Figure 1C:
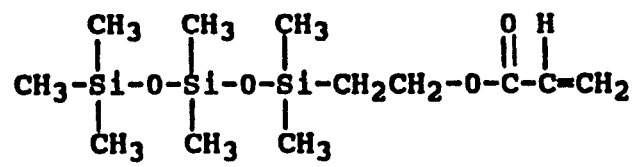
Figure 1C:
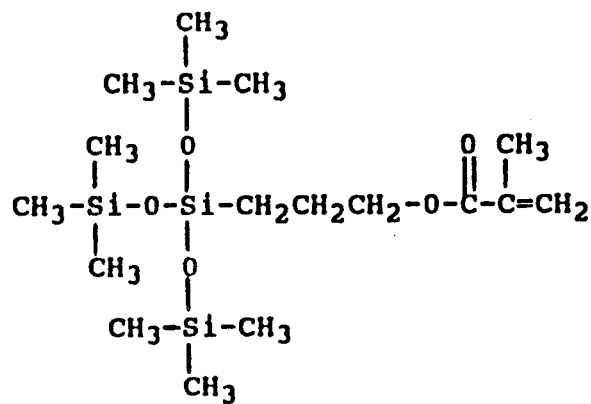
Figure 1C:
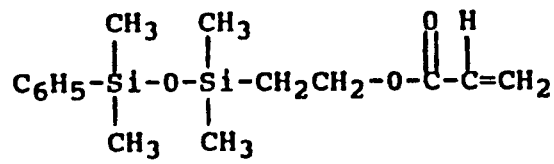

Representative silicone acrylates which are employed for use in the present invention include, for example, phenyltetraethyldisiloxanylether methacrylate, triphenyldimethyldisiloxanylmethyl acrylate, isobutylhexamethyltrisiloxanylmethyl methacrylate, methyldi(trimethylsiloxy)-methacryloxymethylsilane, n-propyloctamethyltetrasiloxanylpropylmethacrylate, pentamethyldi(trimethylsiloxy)-acryloxymethylsilane, t-butyltetramethyldisiloxanylethylacrylate, n-pentylhexamethyltrisiloxanylmethylmethacrylate, tri-i-propyltetramethyltrisiloxanylethyl acrylate, pentamethyldisiloxanylmethyl methacrylate, heptamethyltrisiloxanylethyl acrylate, tris(trimethylsiloxy-3-methacryloxypropylsilane and phenyltetramethyldisiloxanylethyl acrylate, among others, including mixtures of these silicone acrylates. Chemical structures of the above-named silicone acrylate monomers are presented in FIG. 1. Other silicone acrylates for use in the present invention include the alkoxysilicone acrylates, such as those described in U.S. Pat. No. 4,861,840 to Lim, et al., relevant portions of which are incorporated by reference herein, as well as other numerous silicone acrylates which are readily available in the art.

Particularly preferred silicone acrylates for use in the preformed acrylic copolymers according to the present invention include TRIS(trimethylsiloxy)-3-methacryloxypropylsilane (TRIS). In the preformed copolymers of the present invention, the amount of silicone acrylate used ranges from about 10% to about 100% by weight, preferably about 20% to about 85% by weight and most preferably about 30% to about 80% by weight. In the final compositions according to the present invention, the amount of silicone acrylate generally ranges from about 5% to about 85% by weight. More preferably, the amount of silicone acrylate comprises about 10% to about 50% by weight of said composition and most preferably, about 15% to about 25% by weight of said composition.

In the soft contact lens aspect of the present invention, preformed silicone-containing acrylic copolymers that have improved the balance of the properties of soft lenses are macromonomer, graft copolymers and star polymers that have a block consisting essentially of monomeric units of one or more silicon acrylates (approaching 100% silicone acrylate) and a block containing at least a substantial proportion of monomeric units of hydrophilic acrylic-type monomers, i.e., enough hydrophilic monomer to provide sufficient overall hydrophilic character to the preformed copolymer to enhance the solubility of the preformed copolymer in the polymer matrix monomer mixture. In general, the amount of hydrophilic acrylic-type monomer is at least about 20% by weight of the substantially hydrophilic block. Preferably, the amount of hydrophilic monomer ranges from about 50% to about 100% and most preferably ranges from about 85% to about 97+% by weight of the hydrophilic block.

In mid to high water content soft contact lenses, preferred preformed copolymers are made with a pure block of silicone acrylate and a hydrophilic block containing a random copolymer of HEMA and silicon acrylate or HEMA and methyl methacrylate which has characteristics of solubility in the polymer matrix comonomer mixture. Most preferably, the substantially hydrophilic block comprises a random copolymer of HEMA and methyl methacrylate, because of the neutral surface characteristics such copolymers impart to the final compositions. The following provides a range of compositions that have exhibited acceptable compatability with hydrophilic monomers and have been incorporated into soft contact lenses:

| Permeable Block (Weight Percent) | // | Hydrophilic Block (Weight Percent) | | |
|---|---|---|---|---|
| TRIS | | HEMA | / TRIS / | MMA |
| 80 | | 20 | 0 | 0 |
| 75 | | 18 | 7 | 0 |
| 59 | | 30 | 11 | 0 |
| 67 | | 17 | 16 | 0 |
| 33 | | 42 | 24 | 0 |
| 51 | | 19 | 30 | 0 |
| 61.5 | | 7.5 | 0 | 31 |

In general, the size of the hydrophilic block of the preformed acrylic copolymer in this soft contact lens aspect of the present invention ranges from about 10% to about 90% by weight of the total weight of the copolymer. Preferably the hydrophilic block ranges from about 20% to about 70% by weight of the copolymer. The composition of the hydrophilic block generally ranges from about 20% to about 100% by weight of a hydrophilic acrylic-type monomer, preferably a hydrophilic ester of acrylic acid or methacrylic acid and 0% to about 80% by weight of a silicone acrylate or other monomer, most preferably methyl methacrylate. Preferably, the hydrophilic block of the preformed acrylic copolymer ranges from about 50% to about 97+% by weight of a hydrophilic acrylic-type monomer.

The size of the substantially hydrophobic, permeable block in the preformed silicone-containing acrylic copolymer in the soft contact lens aspect of the present invention ranges from about 10% to about 100% (generally less than about 90% within this range) by weight of the preformed acrylic copolymer with 30% to about 80% being preferred. In general, this block comprises about 50% to about 100% by weight of a silicone acrylate with about 80% to about 100% by weight silicone acrylate preferred. Other traditional hydrophilic and non-hydrophilic acrylic-type esters may be copolymerized with the silicone acrylates in the permeable block with methyl methacrylate, hydroxyethylmethacrylate and methacrylic acid being preferred.

The preformed acrylic polymer for use in the soft contact lens aspect of the present invention may be a linear polymer, a graft copolymer or a star polymer each of which contains at least two distinct blocks or regions (one hydrophobic and permeable, one hydrophilic in character). Reactive double bonds may be attached at the ends of either the linear or star polymer chains or they may be distributed along the chain(s). Preferably, the reactive double bonds are distributed in the hydrophilic block of the preformed acrylic copolymer. The presence of the double bond(s) is not essential, although it is preferred. In the case of macromonomers, most preferably, at least on average, about 1 to 3 double bonds are preferred with a most preferred number of double bonds ranging from about 1.5 to about 2 double bonds per copolymer. It is noteworthy that the double bonds which are included in the preformed copolymers according to the present invention represents an "average" number of bonds, and will range within a given population of copolymers from about "0" to significantly higher than the average. Gaussian distribution of double bonds applies to the population of copolymers.

The amount of preformed acrylic copolymer used in the soft lens composition generally ranges from about 10% to about 98% (generally, less than about 90% by weight of the final composition, but amounts as high as 100% are possible) by weight of preformed acrylic copolymer, preferably about 15% to about 60% by weight acrylic copolymer, with about 20% to about 45% being most preferred.

In certain embodiments fluorine containing esters ("fluoro esters") of alpha, beta unsaturated acids, including for example, acrylic and methacrylic acid may be added to the macromonomers, star polymers and the polymer matrix to provide deposit resistance and in certain cases, enhanced oxygen permeability characteristics in the final copolymers. These fluoro esters include for example, perfluoroalkyl alkyl methacrylates and acrylates, telomer alcohol acrylates and methacrylates including, for example, those disclosed by Cleaver in U.S. Pat. No. 3,950,315, additional fluoroesters of acrylic and methacrylic acid including, for example, 2,2,3,3,4,4,4-heptafluorobutyl acrylate, 2,2,3,4,4,4-hexafluorobutylmethacrylate as well as numerous additional fluoro esters.

The polymer matrix, in addition to at least one hydrophilic monomer, may also comprise at least one crosslinking monomer. Crosslinking monomers are generally used in the star polymers of the present invention and are optionally used in the macromonomers, graft copolymers and polymer matrix of the present invention. In the polymer matrix, crosslinking monomers may be used especially when the amount of water content exceeds about 40% by weight of the final hydrated composition. In the case of mid to high water content soft contact lens copolymers, crosslinking monomers are used in varying amounts and generally in amounts less than about 5.0% by weight, preferably about 0.05% to about 1.5% by weight and most preferably about 0.2% to about 0.5% by weight of the final copolymer.

Exemplary crosslinking monomers have at least two polymerizable alpha, beta unsaturated acid esters or amides, and include, for example, ethylene dimethyacrylate, 1,3-butylene dimethacrylate, tetraethyleneglycol dimethacrylate (TEGMA), triethylene glycol dimethacrylate, trimethylolpropane trimethacrylate (TMPTMA), ethylene glycol dimethacrylate (EGMA), 1,6-hexylene dimethacrylate, 1,4-butylene dimethacrylate, ethylene diacrylate 1,3-butylene diacrylate, tetraethyleneglycol diacrylate, triethylene glycol diacrylate, trimethylolpropane triacrylate, 1,6-hexylene diacrylate and 1,4-butylene diacrylate. Preferred crosslinking monomers for use in soft contact lenses include TEGMA, EGMA and TMPTMA, and mixtures of these crosslinking monomers, among others.

In general, the amount of crosslinking agent included in the star polymers according to the present invention ranges from about 0.5% to about 15.0%, preferably about 1% to about 3% by weight, depending upon the size of the core that is desired. Crosslinking monomer may also be included in macromonomers and graft copolymers of the present invention as well, but the inclusion of such monomers is less preferred.

The compositions according to the present invention preferably include sufficient quantities of a hydrophilic monomer to provide a final hydrated composition comprising at least about 10% by weight water. The hydrophilic monomer is included in the polymer matrix to provide the contact lens with an ability to evenly disperse water on the surface of the contact lens. Exemplary hydrophilic monomers for use in the present invention include acrylic acid, methacrylic acid, itaconic acid, fumaric acid, maleic acid, crotonic acid, N-vinylpyrrolidone, N-vinylpyridine, N-vinylcaprolactam, morpholine-containing wetting monomers, hydroxyalkylacrylates and methacrylates including hydroxyethyl methacrylate, hydroxyethylacrylate, hydroxypolyethoxyethylmethacrylate, polyethyleneoxide(meth)acrylate, among others, acrylamide, methacrylamide, N-isobutoxymethylacrylamide, N-isobutoxyacrylamide, N-methylolacrylamide, N-methylolmethacrylamide, glycidyl acrylate and methacrylate, dimethylaminoethylmethacrylate (DMAEMA), diethylaminoethylmethacrylate (DEAEMA), glycerol methacrylate and acrylate, among others. Many of these hydrophilic monomers also find use for incorporation into the preformed silicone-containing copolymers according to the present invention. Preferred hydrophilic monomers for use in the polymer matrix of the copolymers of the present invention include methacrylic acid, glycerol methacrylate, polyethyleneoxydimethacrylate, hydroxyethyl methacrylate and N-vinylpyrrolidone.

Acrylic-type hydrophilic monomers are generally included in the macromonomers, graft copolymers and star polymers of the present invention. Of course, one of ordinary skill in the polymer art will be able to chose the type and amount of hydrophilic monomer for use in the preformed acrylic copolymers of the present invention. In the case of soft contact lens copolymers, the total amount of hydrophilic monomer included in the final composition which includes the polymer matrix and preformed copolymer generally ranges from about 20% to about 90%, most preferably about 60% to about 85% by weight of the final composition.

Preferred hydrophilic monomers for use in the polymer matrix of soft contact lenses include hydroxyethyl methacrylate (HEMA), methacrylic acid and N-vinyl pyrrolidone (VP), and mixtures thereof with HEMA, a mixture of HEMA and methacrylic acid (the amount of methacrylic acid generally ranging from about 1% to about 8% by weight of the final composition), VP or a mixture of VP and HEMA preferred. In certain instances a combination of the above-mentioned systems in combination with N-isobutoxymethylacrylamide (IBMA) may also be used. Particularly prefered is a mixture of HEMA, MAC and IBMA. The type and amount of hydrophilic monomer chosen will be determined by the amount and type of silicone acrylate included in the macromonomers, stars, polymer matrix and ultimately, the final composition.

Many of the same acrylic-type monomers included within the polymer matrix of the present invention may also be included in the macromonomers, graft copolymers or star polymers of the present invention. Other useful ingredients and techniques for synthesizing macromonomers, graft copolymers and star polymers will be found in U.S. Pat. No. 4,417,034 to Webster, which is incorporated by reference herein. Of particular note in synthesizing macromonomers, graft copolymers and star polymers is the use of certain monomers described hereinabove whose function it is to improve wetting or deposit resistance. Preferred wetting monomers for this purpose include, for example, methacrylic acid, acrylic acid, dimethylaminoethyl methacrylate, diethylaminoethyl methacrylate, hydroxyethyl methacrylate and glyceryl methacrylate.

In the preparation of the macromonomer, graft and acrylic star block copolymers of the present invention, use may be made of the "group transfer" polymerization process of the general type described in part by W. B. Farnham and D. Y. Sogah, U.S. Pat. No. 4,414,372 and by O. W. Webster, U.S. Pat. No. 4,417,034 and in continuation-in-part U.S. Pat. Nos. 4,508,880, Webster, granted Apr. 2, 1985, and 4,524,196 Farnham and Sogah, granted June 18, 1985, all of which patents are incorporated by reference herein.

Initiators that are useful in the polymerization of the macromonomer and star polymers of the present invention include, among others, 1-(2-trimethylsiloxy)ethoxy-1-trimethylsiloxy-2-methylpropene, methoxy-2-methyl-1-propenyl)oxy]trimethylsilane; (trimethylsilyl)isobutyronitrile; ethyl 2-(trimethylsilyl)acetate; methyl 2-methyl-2-(tributylstannyl)propanoate; [(2-methyl-1-(1986)). Group Transfer polymerization is the prefered method for making these macromonomers.

The macromonomer for use in the contact lens aspect of the present invention generally range in molecular weight from about 1,000 to about 20,000. The prefered range is from about 5,000 to about 15,000. The molecular weight of the macromonomers may be determined using standard analytical techniques, including gel permeation chromatography, light scattering, and osmometry.

Exemplary macromonomer polymers for use in the present invention include but are not limited to the following [The values given represent the weight percent of each monomer in the polymer. A double slash indicates a separation between blocks, and a single slash indicates a random copolymer or random composition in a specific block];

| Type of Polymer | Composition | Block Next to Double Bond | Molecular Weight Mn |
|---|---|---|---|
| MACRO MONOMER | TRIS//TRIS/HEMA 75//7/18 | TRIS/HEMA Hydrophilic | |
| MACRO MONOMER | TRIS//TRIS/HEMA 33//24/42 | TRIS/HEMA Hydrophilic | About 14,400 |
| MACRO MONOMER | TRIS//TRIS/HEMA 59//11/30 | TRIS/HEMA Hydrophilic | |
| MACRO MONOMER | TRIS//TRIS/HEMA 70//12/18 | TRIS/HEMA Hydrophilic | About 10,000 |
| MACRO MONOMER | MAA/TRIS/HEMA//TRIS 2.5/14/25//58.8 | MAA/TRIS/HEMA Hydrophilic | |
| MACRO MONOMER | TRIS//HEMA/MMA 60//36.5/3.5 | HEMA/MMA Hydrophilic | About 10,000 | cyclohexenyl)oxy]tributylstannane; trimethylsilyl nitrile; methyl 2-methyl-2-(trimethylgermanyl)propanoate; [(4,5-dihydro-2-furanyl)oxy]trimethylsilane; [(2-methyl-1-propenylidene)bis(oxy)]bis[trimethylsilane]; [(2-methyl-1-[2-(methoxymethoxy)ethoxyl]-1-propenyl)oxy]trimethylsilane; methyl [(2-methyl-1-(trimethylxilyloxy)-1-propenyl)oxy]acetate; [(1-(methoxymethoxy)-2-methyl-1-propenyl)oxy]trimethylsilane; [(2-ethyl-1-propoxy-1-butenyl)oxy]-ethyldimethylsilane; ethyl 2-(trimethylstannyl)propanoate; [(2-methyl-1-butenylidene)bis(oxy)]bis[trimethylsilane]; 2-(trimethylsilyl)propanenitrile; ethyl(trimethylgermanyl)acetate; [(1-((1- dec-2-enyl)oxy)-2-methyl-1-propenyl)oxy]trimethylsilane; phenyl 2- methyl-2-(tributylstannyl)propanoate; methyl 2-(triethylsilyl)acetate; [(2-methyl-1-cyclohexeneyl)oxy[tributylstannane; [(1-methoxy-2-methyl-1-propenyl)oxy]phenyldimethylsilane.

Macromonomers are linear homopolymers, block polymers, or random copolymers that preferably have at least one polymerizable group at one end of the polymer chain. The polymerizable group may be a double bond from a methacryloxy, an acryloxy, a styrenic, an alpha methyl styrenic, an allylic, a vinylic, or other olefinic groups. Acrylic macromonomers can be prepared by the Group Transfer Polymerization process using functional initiators and a capping process to protect the functional group during polymerization, by anionic polymerization followed by a capping process (as described by Milkovich and Chiang, U.S. Pat. No. 3,786,116), by free radical polymerization using functional chain transfer agents followed by a capping process (as described by Gillman and Senogles *Polymer Lett.*, 5, 477 (1967)), or by free radical polymerization using special cobalt catalysts (as described by Rizzardo, et. al., *J. Macromol. Sci.-Chem.*, A23 (7), 839–852 (1986)).

Such macromonomers are especially useful for forming comonomer syrups for bulk polymerization to form copolymers for use in oxygen-permeable contact lenses.

In the case of soft contact lens copolymers, dramatic improvement in the oxygen permeability of these copolymers may be made by copolymerizing macromonomers and star polymers with conventional monomers which form the polymer matrix of the soft contact lens. In addition, the resulting soft contact lens copolymers exhibit enhanced toughness or durability relative to traditional soft contact lenses. These macromonomers and star polymers generally have a block of a highly permeable monomer, such as a silicon acrylate (TRIS) and a block of a hydrophilic non-silicone ester, such as HEMA or glyceryl methacrylate. The purpose of the hydrophilic block is to solubilize or disperse the permeable block in the monomers of the polymer matrix which also are generally hydrophilic so that compatability occurs and a soft contact lens having favorable physical characteristics is produced. Conventional free radical initiators and crosslinking monomers are used to provide a good balance of properties. The macromonomer may be linear or branched.

Star polymers are high molecular weight polymers that have a number of linear, acrylic arms radiating out from a central core. The arms are linear polymers that may be homopolymers, copolymers, or block polymers, and may have functional groups located at the end of the arms or distributed along the chain. The cores are highly crosslinked segments of difunctional acrylates or copolymers of monofunctional and difunctional acrylates. The manner in which star polymers of the present invention are prepared include the "arm-first", "core-first", and "arm-core-arm" methods, as described in Spinelli U.S. Pat. No. 4,810,756 which is incorporated herein by reference.

The molecular weight of the arms of the star polymers may range from about 1,000 to about 20,000. The prefered range is from about 5,000 to 14,000. The number of arms per star is dependent on the composition and process used to make the star. The number of arms that are present can be determined by dividing the molecular weight of the entire star by the molecular weight of the arms. The number of arms generally range from about 5 to about 5,000. The preferred range is about 10 to about 200. The molecular weight of both the arms and the star can be determined by using standard analytical techniques, such as gel permeation chromatography, light scattering, and osmometry. Factors affecting the number and length of arms in star polymers of the present invention are the same as those described in U.S. Pat. No. 4,810,756. A preferred number average molecular weight of star polymers according to the present invention is about 50,000 to about 500,000.

Useful star polymers for use in the soft contact lens aspect of the present invention include but are not limited to the following [a single slash indicates a random copolymer or random composition in a specific block];

can attach a polymerizable double bond to the polymer. Such compounds include, for example, any molecule that has a second functional group that can react with the first functional group in addition to a polymerizable double bond. It is preferred that the polymerizable double bond should be selected to promote solubility of the pre-formed acrylic polymer in the polymer matrix. One of ordinary skill in the art will recognize that the chemistry of the polymerizable double bond may be varied to promote the solubility characteristics of the pre-formed polymer.

Examples of functional groups that can be present on the macromonomer or star polymer include hydroxy, carboxylic acid, epoxy, and aziridine. The functional group may be present as such or may be present in blocked form which requires the removal of the blocking group before attachment of the polymerizable double bond. The functional group may be attached to the polymer through either a functional initiator or a functional terminal monomer. Examples of the second functional group that can be reacted with the first functional group include epoxy, hydroxy, acid, aziridine, isocyanate, acid chloride, anhydride, and ester, among others.

Blocked hydroxyl initiators which can be used in the

| Type of Polymer | Composition | Block Containing to Double Bond | Molecular Weight Of Arm Mn |
|---|---|---|---|
| STAR | TRIS//HEMA/TRIS//EGDM 71//20/9 | HEMA/TRIS Hydrophilic | about 11,000 |
| STAR | TRIS//HEMA/TRIS//EGDM 64//20/16 | HEMA/TRIS Hydrophilic | about 11,000 |
| STAR | TRIS/HEMA//TRIS//Z6030/MMA 15/19.5//61.5//2/2 | TRIS/HEMA Hydrophilic | about 15,000 |
| STAR | TRIS//HEMA/TRIS 75//18/7 | HEMA/TRIS Hydrophilic | about 16,000 |
| STAR | TRIS//HEMA 83//17 | HEMA Hydrophilic | about 19,900 |
| STAR | HEMA//TRIS 17.4//82.6 | HEMA Hydrophilic | about 19,000 |
| STAR | HEMA//TRIS//Z6030/MMA 35.5/55.6//7.1//1.8 | HEMA Hydrophilic | about 31,800 |

In the case of graft copolymers, these may be synthesized in several ways, using Group Transfer Polymerization (GTP) or free radical polymerization as described hereinabove. Graft copolymers may be synthesized in parts through GTP and through free radical polymerization, totally through GTP or totally through free radical polymerization. Thus, in the graft copolymers according to the present invention, numerous monomers may be incorporated, including, for example, (meth)acrylates, acrylates, acrylonitriles, styrenes and olefins, among others. Using the above methodologies, graft copolymers can be made by synthesizing the backbone first and then forming the arms off of the backbone; synthesizing the arms first and then tying up the arms to a synthesized backone; or synthesizing both the backbone and the arms and then combining the backbone and arms to form the graft copolymer.

The macromonomers, graft copolymers and star polymers preferably contain polymerizable double bonds to facilitate polymerization with the monomers of the polymer matrix to synthesize copolymers of the present invention. The polymerizable double bond that is attached to the macromonomer or to the arms of the stars may be a methacryloxy, an acryloxy, a styrenic, an alpha methyl styrenic, an allylic, a vinylic, or other olefinic groups. It can be attached to the macromonomer, graft copolymer or star polymer by reacting a functional group on the polymer with compounds that macromonomers and star polymers of the present invention include 1-(2-trimethylsiloxyethoxy)-1-trimethylsiloxy-2,methyl propene and 1-[2-(methoxymethoxy)ethoxyl]-1-trimethylsiloxy-2-methylpropene. Blocked hydroxyl monomers which can be used include 2-(trimethylsiloxy)ethyl methacrylate, 2-(trimethylsiloxy)propyl methacrylate, and 3,3-dimethoxypropyl acrylate. Blocked hydroxyl monomers which can be used include 2-(trimethylsiloxy)ethyl methacrylate, 2-(trimethylsiloxy)propyl methacrylate and 3,3-dimethoxypropyl acrylate. When the polymerization is completed, the blocking group is removed to give a hydroxy functional polymer. Examples of hydroxy functional monomers include: 2-hydroxyethyl acrylate, 2-hydroxyethyl methacrylate, hydroxypropyl acrylate, and hydroxypropyl methacrylate.

Upon deblocking, the hydroxy group is then reacted with compounds that can attach a polymerizable double bond to the polymer. Examples of these include: 2-isocyanatoethyl methacrylate, methacryloyl chloride, acryloyl chloride, alpha-Methylstyrene isocyanate, acrylic acid, methacrylic acid, anhydrides of acrlic and methacrylic acid, maleic anhydride, and esters of acrylic and methacrylic acids in transesterifcation reactions.

Blocked acid initiators which can be used include 1,1-bis(trimethylsiloxy)-2-methyl propene and 1,1-bis(- trimethylsiloxy)propene. Blocked acid monomers which can be used include trimethylsiloxy methacrylate and 1-butoxyethyl methacrylate. When the polymerization is completed, the blocking group is removed to give an acid functional polymer. Acid monomers which can be used include acrylic acid, itaconic acid, and methacrylic acid.

The acid group is then reacted with compounds that contain a polymerizable double bond and can be attached to the polymer. Examples of these include: glycidyl acrylate and methacrylate, aziridinyl acrylate and methacrylate, and hydroxy esters of acrylic and methacrylic acid.

The preformed silicone-containing acrylic copolymers, i.e., macromonomers, graft copolymers and star polymers of the present invention which includes soft contact lens copolymers generally comprise about 10.0% to about 98% by weight of the copolymer of the present invention, preferably about 15% to about 60% by weight of said material, and most preferably about 20% to about 45% by weight of said polymer.

Soft contact lenses made from the contact lens compositions according to the present invention exhibit surprisingly high oxygen permeability and enhanced durability or toughness in comparison to conventional soft contact lenses while maintaining many of the favorable physical characteristics of soft contact lenses including drapeability and comfort. In addition, because the soft contact lenses according to the present invention in many cases exhibit greater structural integrity owing to the incorporation of macromonomers and/or star polymers, optics of these lenses are improved relative to conventional contact lenses. In addition, because of the increased durability of soft contact lens polymers of the present invention, the lenses may be made very thin, in many cases, having a center thickness no greater than about 0.05 mm. Thus, in certain embodiments of the present invention contact lenses having oxygen transmissibilities (Dk/L) of greater than about $$80 \times 10^{-9} \frac{cm^3}{s \; cm \; mm \; Hg}$$

and higher are possible.

In the method of making copolymers according to the present invention, a novel feature of the present invention relates to the bulk copolymerization of preformed acrylic copolymer in combination with the mixture of monomers which comprise the matrix. In this method of the present invention, the individual monomers and the preformed acrylic copolymer are mixed together to produce a liquid mixture, which is subsequently placed in a polymerization tube or a mold and then polymerized. The copolymer thus produced may be extruded, pressed or molded into rods, sheets or other convenient shapes which may be machined to the desired shape using conventional equipment and procedures for producing contact lenses readily known to those of skill in the art. Polymerization is produced by a thermal process, by use of ultraviolet light or gamma radiation or by a combination of these methods. In certain cases in which the amount of preformed acrylic copolymer is very high, i.e. above about 85% by weight of the composition and approaching 100% by weight of the copolymer, it may be necessary to first dissolve the macromonomer and/or star polymer in an appropriate organic solvent, for example, a chlorinated hydrocarbon such as methylene chloride, before polymerization.

Where such a high weight percentage of macromonomer graft copolymer and/or star polymer is used the matrix will generally include high weight percentages of wetting monomer. In general, the monomers that are used for the matrix of the copolymer dissolve the macromonomer, graft copolymer and star polymer to produce a viscous solution which may then be polymerized. There is generally no need to add an organic solvent to the mixture except where the amount of macromonomer or star polymer is included at such a high weight percentage that the amount of comonomer is insufficient to dissolve the macromonomer or star polymer. Alternatively, it may be possible to utilize extrusion processes readily available in the art to provide acceptable mixtures for polymerization and contact lens copolymer formation.

To synthesize the copolymers according to the present invention, the individual monomers are first mixed together to produce a viscous solution of monomer. Thereafter, the selected macromonomer, graft copolymer or star polymer is then mixed with the viscous solution of monomer and is then agitated with a mechanical stirrer or on an industrial tumbler (U.S. Stoneware Corp. Mahwah, N.J. USA) for a few hours to about 5 days, usually for about 3 to 5 days at low speed, e.g., about 20 rpm to about 320 rpm, preferably about 30 to 40 rpm, until the mixture is a viscous solution/dispersion. This process of adding the macromonomer or star polymer after the monomers are in solution reduces the difficulty of mixing solutions/dispersions with these preformed polymers. Thereafter, the mixture is poured into button molds, tubes, or in a cast base curve radius type mold. The mixture is polymerized in the presence of at least one free radical initiator which comprises about 0.05% to about 4.0%, preferably no more than about 3.0% by weight of the mixture. In certain cases polymerization may be effectuated by the use of gamma radiation. Polymerization initiators for use in the present invention are those which are commonly used in polymerizing ethylenically unsaturated compounds. Representative free radical polymerization initiators include peroxide containing compounds including acetyl peroxide, benzoyl peroxide, lauroyl peroxide, decanoyl peroxide, caprylyl peroxide, tertiary-butyl peroxypivalate, diisopropyl peroxycarbonate, tertiary-butyl peroctoate and alpha, alpha'-azobisisobutyronitrile. Preferred initiators for use in the present invention include 2,2'-Azobis[2,4-dimethylvaleronitrile] (Vazo 52 ™), 2-Hydroxy-2-methyl-1-phenylpropan-2-one (Daracure 1173 ™), 4-(2-Hydroxyethoxy)Phenyl(2-Hydroxy-2-Phenyl-(2-Hydroxy-2-Propyl)Ketone (Daracure 2959 ™), Irgacure 500 ™ (a mixture of 1-hydroxycyclohexylphenylketone and benzophenone) and benzoinmethylether (BME).

Conventional polymerization techniques may be used to produce the copolymers of the present invention. Two methods of polymerization are preferred. The first method utilizes heat; the second utilizes ultraviolet light or ultraviolet light and heat. Most preferably, polymerization by ultraviolet light (either low or high intensity) is utilized.

In the case of heat polymerization of soft contact lenses, the solutions containing monomer mixture and preformed silicone-containing acrylic copolymer may be placed in a polymerization tube, capped and heated in a water bath or oven at a temperature ranging from about 40° C. to about 90° C. for a number of hours (generally ranging from about 5 hours to about 18 hours or more). Thereafter the tubes are cooled to room temperature and the rods are punched out, ground down and cut into buttons. These buttons are then lathed and polished into contact lenses using standard procedures and then hydrated to produce soft contact lenses according to the present invention. Other heat procedures may also be used. Heat polymerization may also be used to produce finished contact lenses via cast-molding.

In the case of ultraviolet polymerization, ultraviolet light (low or high intensity) is generally applied to the solution containing the preformed silicone-containing acrylic copolymer in combination with polymer matrix. Irradiation is generally applied for a period ranging from about 10 minutes to about 120 minutes or longer. Thereafter, the buttons are removed from the molds and then lathed, polished and hydrated by means readily available in the art. Alternatively and preferably, finished contact lenses are made by ultraviolet polymerization (high or low intensity) in soft contact lens molds (base curve and/or power curve) via cast-molding in standard plastics such as polypropylene, polystyrene, nylon, polyacrylonitrile and the like. Other methods well within the routineer's skill in the art are applicable as well.

One of ordinary skill in the art will recognize that the disclosed procedures for polymerizing contact lenses according to the present invention are merely exemplary and in no way should be construed to limit the present invention in any way.

The copolymers and contact lenses of the present invention exhibit enhanced characteristics of at least one of the characteristics of oxygen permeability, machining and durability. In the case of soft contact lenses, it is quite surprising that contact lenses could be made having high oxygen permeability and a toughness which would enable the contact lens to be made with a center thickness of about 0.05 mm. In the examples that follow, contact lenses of the present invention were compared with lenses synthesized by a conventional random polymerization process and evidenced substantially superior characteristics.

Contact lenses prepared from the copolymers according to the present invention generally have a refractive index ranging from about 1.35 to about 1.50, preferably about 1.40. Contact lenses of the present invention preferably exhibit a Dk in excess of about 40. Dk's in excess of 45 are particularly preferred so that oxygen transmissibilities (Dk/L) in excess of 80 or $$90 \times 10^{-9} \frac{cm^3}{s\ cm\ mm\ Hg}$$

are realized.

After preparation of the copolymers as described hereinabove, they are fabricated into hydrated soft contact lenses and the resultant lenses are then fitted to the eye of a patient suffering from visual deficiency in accordance with known prior art techniques for fabricating or fitting contact lenses.

The following examples are provided to illustrate the present invention and should not be construed to limit the scope of the present invention in any way.

EXAMPLES

Comparison I

This describes the preparation of conventional soft contact lenses made by a random copolymerization of monomers.

Formulation:

The following materials were mixed together:
Hydroxyethyl methacrylate (HEMA), methacrylic acid (MAC), ethylene glycol dimethacryalte (EGMA) and either 0.2% or 0.5% Daracure 1173 TM. The solution was poured into button molds, soft contact lens molds, or polyethylene film molds (to make films of various thickness) and polymerized.

Methods of Polymerization:

Method 1: UV polymerization (Low Intensity). The mixture was placed under 4 20 watt metal halide UV lamps and polymerized for a period of time ranging from about 15 minutes to about 16 hours.

Method 2: UV polymerization (High Intensity). The mixture was placed under a Dimax PC-2 400 Watt UVA, metal halide lamp, 120 VAC, 60 Hz.

Method 3: Heat Polymerization. Mixture may be heat polymerized using standard heat polymerization techniques and initiators (preferably VAZO's).

Lens Manufacturing:

Lenses were polymerized in soft contact lens molds (polypropylene, polystyrene, polyethylene) and edged after polymerization.

Alternatively, a lathe was used to cut lenses using standard production procedures.

Results:

The above formulation made good traditional contact lenses, having water contents ranging from about 35% to about 75% and True Dk's ranging from about 8 to about 45. In the case of the present invention, lens materials having water contents ranging from about 15% to above 80% by weight and with Dk's up to about 150 have been made.

Oxygen Permeability:

Oxygen permeabilities are determined using standard techniques for hydrated soft contact lens materials. A preferred method for determining oxygen permeability in the following examples is described by Irving Fatt and Jennnifer Chaston in *International Contact Lens Clinic* (*I.C.L.C.*), 9, 76 (1982) or alternatively, Fatt and Weissman, Optom. & *Vis. Sci.*, 66, (4) 235-238 (1989). The contact lenses materials tested ranged in thickness from about 0.07 to about 0.45 (preferably about 0.1 to about 0.3). The values given are the diffusion constants:

$$Dk = \times 10^{-11} \frac{cm^3\ cm}{s\ cm2\ mm\ Hg}$$

Transmissibility numbers are provided as Dk/L $$Dk/L = \times 10^{-9} \frac{cm^3}{s\ cm\ mm\ Hg}$$

Measured Dk's are determined on a $O_2$ Permeometer TM Model 201T by Createch, Albany, Calif.

True Dk's are determined using three thickness and determining the slope of a graph of (L vs. L/Dk) using linear regression. One point calculated Dk's are determined using the following formula:

$$\text{Calculated } Dk = \frac{\text{lens thickness} \times 1000}{\left[\frac{\text{lens thickness} \times 1000}{\text{measured permeability}} - 2.98\right]}$$

Water Content Measurements:

Water content is determined one of two ways. In the first method, a freshly polymerized lens is weighed and then hydrated. The water content is determined by simply subtracting the dry weight from the hydrated weight and then dividing by the hydrated weight.

Alternatively, and preferably, water content is determined by first extracting any unreacted monomer for 18 hours in boiling 0.1 M aqueous phosphate buffer (pH 7.5-8), drying the lens and subsequently hydrating the lens. Lenses are hydrated in distilled water for a period of at least about 1 hour or until equilibrium is reached (which may vary depending upon the chemical composition of the contact lens). Water content is determined by substracting the dry weight from the hydrated weight and then dividing by the hydrated weight.

Comparisons

The following presents a series of soft contact lenses which is made by copolymerization of hydroxyethylmethacrylate (HEMA), methacrylic acid (MAC) and ethylene glycol dimethacrylate (EGMA). The EGMA is added to the monomer mixture to crosslink the lens material and provide greater structural integrity to the softlens material.

| Compar- ison Runs | Formulation | | | Initiator Daracure 1173 | Properties | |
|---|---|---|---|---|---|---|
| | HEMA | MAC | EGMA | | $H_2O$ | True DK |
| 1 | 99.5 | 0 | 0.5 | 0.2 | 35.8 | 8.5 |
| 2 | 98.5 | 1 | 0.5 | 0.2 | 42.5 | 11 |
| 3 | 97.5 | 2 | 0.5 | 0.5 | 49.3 | 15 |
| 4 | 96.5 | 3 | 0.5 | 0.2 | 54.3 | 19 |
| 5 | 95.5 | 4 | 0.5 | 0.2 | 61.4 | 24 |
| 6 | 93.5 | 6 | 0.5 | 0.2 | 69.5 | 35 |
| 7 | 91.5 | 8 | 0.5 | 0.2 | 76.2 | 45 |

The above table shows the results that are obtained with conventional random copolymerization of traditional hydrophilic monomers.

The results from Comparisons 1 to 7 are standard for lenses made from a random copolymerization of hydrophilic monomers such as HEMA and MAC. These results indicate that as the water content of a contact lens material increases, the oxygen permeability increases. At very high water contents (>70%), the toughness and structural integrity of the lens materials decreases.

EXAMPLES 1-27

In the examples that follow, the compositions are expressed in terms of the weight ratios of the final compositions. The following describe the composition and synthesis of star polymers that have arms that are diblocks (hydrophilic and hydrophobic blocks), cores that are ethyleneglycol dimethacrylate or silicone (Z6030-polysiloxane), and a polymerizable double bond attached to the hydrophilic block of the arms. The examples also describe the use of macromonomers that are diblocks (hydrophilic and hydrophobic) and have polymerizable double bonds incorporated into the hydrophilic block of the copolymers.

The following show the advantages obtained by using star and macromonomer polymers in soft contact lens formulations.

Preparation Procedure for Lenses Made with Stars or Macromonomers

I. Mixing Procedure

All liquid ingredients were weighed and mixed in screw-on-cap bottle shaken and stirred or tumbled for a period ranging from an hour to several days. The star or macromonomer was weighed and added to the liquid ingredients in small portions (from 10% to 50% by weight). In order to disperse the powder in the bulk of the mixture, after each addition the mixture was stirred using a magnetic stirrer, the bottle then capped and sealed properly, tumbled on a roller mill until the solution was clear and homogeneous (from one hour to several days). In certain instances, the mixture had to be filtered before use. The initiator and optionally, pigment were added and tumbled for half an hour, then poured into molds, tubes, or spread onto plates for forming polymeric films.

II. Polymerization Procedure

Thermal Polymerization:

In general, solutions were poured into molds and put in a water bath or an oven for about one hour to 18 hours or more at varying temperatures (generally about 40° C. to about 60° C.). The molds or tubes were then further heated at a slightly higher temperature and finally the temperature was raised to 110° C. for a number of hours (usually at least about 6-8 hours). Sometimes an extra 24 hours at 130° C. was used. The tubes or molds were cooled to room temperature and the rods, molded buttons, films or final lenses were punched out or otherwise removed. The rods were ground to the half inch diameter and cut to buttons. The buttons from rods or molds were cut and lathed into lenses. The finished lenses were simply removed from the molds and are edged, where needed. The lenses or films were thereafter hydrated, generally in 0.1M phosphate buffer, pH about 7.5 to 8. Dk was determined on lenses or films of varying thicknesses using standard procedures well known in the art.

The Ultraviolet Method:

After the solution was prepared, it was poured in button molds and placed in a UV box. Nitrogen and vacuum was applied alternatively. Irradiation was applied for 20 to 45 minutes under nitrogen atmosphere under low intensity UV or high intensity UV light (Dimax unit) as previously described. The molds were then removed or alternatively, heated for one to several hours at a temperature ranging from about 80° C. to 110° C. Lenses or buttons were punched out of the molds and faced or polished.

III. Lens Manufacturing

A lathe cut lenses from buttons using standard production procedures. Alternatively, and preferably, the soft contact lenses are made in a soft contact lens mold, removed and hydrated.

SOFT CONTACT LENSES

A number of macromonomers and star polymers were synthesized and incorporated into soft contact lens polymer matrices. The resulting copolymers were then tested for oxygen permeability as a function of water content. The following are examples of the synthesis of macromonomers and star polymers for use in the soft contact lens aspect of the present invention. For purposes of this discussion, the following legend is applicable:

// indicates a block copolymer of the components separated by that symbol;

/ indicates a random copolymer of the components separated by that symbol.

HEMA = 2-hydroxyethylmethacryalte, incorporated into the preformed acrylic copolymer as TMS-HEMA (2-(trimethylsiloxy)ethylmethacryate) which is then hydrolyzed to give HEMA.

Z6030 = 3-(trimethyloxysilyl)propyl methacrylate.
MMA = methyl methacrylate
EDGMA = ethylene glycol dimethacrylate.

EXAMPLE 1

TRIS//HEMA/TRIS 70//18/12 Linear Block Copolymers

This reaction sequence describes the preparation of a linear block copolymer that has a block of 3-methacryloxypropyltris(trimethylsiloxy)silane (TRIS) and a random block containing TRIS and 2-hydroxyethylmethacrylate (HEMA). The TRIS block is prepared first. The double bonds are put in by reaction of hydroxy groups with an isocyanate. There is an average of 3.7 double bonds in each polymer chain and are located in either/both block. A 2 liter flask is equipped with a mechanical stirrer, thermometer, nitrogen inlet, drying tube outlet and addition funnels. TRIS, 163 g; THF, 52 g; bis(dimethylamino)methylsilane (BDMAMS), 2.9 g; p-xylene, 3.2 g; and tetrabutylammonium m-chlorobenzoate (TBACB), 300uL of a 1.0M THF solution were charged to the pot. Initiator 1-(2trimethylsiloxy)ethoxy-1-trimethylsiloxy-2-methylpropene, 5.6 g was injected. Feed I (TBACB, 400uL and THF, 50.3 g) was started and added over 600 min. The TRIS block was polymerized to about 85% conversion after 175 min. At this time, Feed II (2-(trimethylsiloxy)ethylmethacrylate, 56.4 g, TBACB, 200uL and BDMAMS, 0.6 g) was started and added over 250 min. The reaction was allowed to stir overnight under nitrogen atmosphere. The next morning, the reaction was quenched with methanol, 50.2 g, water, 55.8 g; dichloroacetic acid, 375uL and THF, 200 g. It was refluxed for 4 hours. Then 630 g of solvent was distilled off while 240 g of toluene was added. The contents of the flask was distilled until the vapor temperature equaled approximately 110° C. alpha-Methylstyrene isocyanate (TMI from American Cyanamid), 13.8 g and dibutyltin dilaurate, 300uL were added and refluxed for 4.5 hours. This put double bonds at any of the hydroxy-containing sites in the polymer chain. The average number of double bonds in each polymer chain is 4. Butanol, 25 g was added and refluxed for 3 hours. The polymer solution was then dried in a vacuum oven.

This made a linear block copolymer of TRIS/-HEMA//TRIS 70//18/12 with a Mn of 10,000 and Mw of 18,800.

EXAMPLE 2

TRIS//HEMA/TRIS 33//42/24 Linear Block Copolymers

This reaction sequence describes the preparation of a linear block copolymer that has a block of 3-methacryloxypropyltris(trimethylsiloxy)silane (TRIS) and a random block containing TRIS and 2-hydroxyethylmethacrylate (HEMA). The TRIS block is prepared first. The double bonds are put in by reaction of hydroxy groups with an isocyanate. There is an average of 4.2 double bonds in each polymer chain and are located in either/both block.

A 2 liter flask is equipped with a mechanical stirrer, thermometer, nitrogen inlet, drying tube outlet and addition funnels. TRIS, 73.4 g; THF, 51 g; bis(dimethylamino)methylsilane (BDMAMS), 1.1 g; p-xylene, 3.3 g; and tetrabutylammonium m-chlorobenzoate (TBACB), 400uL of a 1.0M THF solution were charged to the pot. Initiator 1-(2trimethylsiloxy)ethoxy-1-trimethylsiloxy-2-methylpropene, 5.2 g was injected. Feed I (TBACB, 400uL and THF, 53.8 g) wa started and added over 600 min. The TRIS block was polymerized to about 91% conversion. At this time, TRIS, 41.9 g; and BDMAMS, 0.8 g; were added in one shot. Then Feed II (2-(trimethylsiloxy)ethylmethacrylate, 130.9 g, TBACB, 200uL and BDMAMS, 1.6 g) was started and added over 240 min. The reaction was allowed to stir overnight under nitrogen atomosphere. The next morning, the reaction was quenched with methanol, 106.1 g, water, 119.4 g; dichloroacetic acid, 800uL and THF, 850 g. It was refluxed for 4 hours. Then solvent was distilled off while toluene was added. The contents of the flask was distilled until the vapor temperature equaled approximately 110° C. alpha-Methylstyrene isocyanate (TMI from American Cyanamid), 14.7 g and dibutyltin dilaurate, 300uL were added and refluxed overnight. This put double bonds at any of the hydroxy-containing sites in the polymer chain. Butanol, 2 g was added and refluxed for 1 hour. The polymer solution was then dried in a vacuum oven.

This made a linear block copolymer of TRIS/-HEMA//TRIS 33//42/24 with a Mn of 14,400 and Mw of 22,000.

EXAMPLE 3

MAA/TRIS/HEMA//TRIS 2.5/14/25//58.8 Linear Block Copolymers

This reaction sequence describes the preparation of a linear polymber that has a random block containing TRIS and 2-hydroxyethylmethacrylate (HEMA) and a block of 3-methacryloxypropyltris-(trimethylsiloxy)silane (TRIS). The HEMA/TRIS random block is prepared first. The double bonds in this polymer is put in by the reaction of acid groups with glycidyl methacrylate. There is an average of 3.5 double bonds in each polymer chain and are located only in the HEMA/-TRIS block.

A 3 liter flask is equipped with a mechanical stirrer, thermometer, nitrogen inlet, drying tube outlet and addition funnels. THF, 71.6 g; initiator 1,1-bis(trimethylsiloxy)2-methylpropene, 8.1 g; TBACB, 250uL and p-xylene, 3.8 g were charged to the pot. Feed I (TBACB, 600uL and THF, 22 g) was started and added over 400 min. Feed II trimethylsilylmethacrylate, 12.2 g, (2-(trimethylsiloxy)-ethylmethacrylate, 97 g, TRIS, 35.5 g, TBACB 250uL and BDMAMS, 1.4 g) was started over 30 min. After 145 min. Feed III (TRIS, 148.1 g; BDMAMS 1.6 g and TBACB, 250uL) was added over 10 min. After stirring overnight, THF, 200 g was added. The reaction was quenched with methanol, 16 g; water and benzyltrimethylammonium hydroxide, 9.0 g of a 40% solution in methanol. The reaction was refluxed for 60 min. Toluene, 480 g, was added. Solvents, 450 g, was distilled off. The reaction was cooled to about 80° C. and another 8.85 g of a 40% methanol solution of benzyltrimethylammonium hydroxide was added. Feed IV (glycidyl methacrylate, 15.4 g) was started and added over 3.5 hours. After completion of feed, the reaction was allowed to stir at 80° C. and the consumption of glycidyl methacrylate was followed by HPLC. When all of the glycidyl methacrylate was consumed, the reaction mixture was dried in a vacuum oven.

EXAMPLE 4

TRIS/HEMA//TRIS//Z6030/MMA 8.7/16//70//2.5/2.0 Star

This reaction sequence describes the preparation of a star polymer that has arms composed of a random block of TRIS and HEMA and a block of TRIS. The TRIS block was prepared first. The core is composed of Z6030 and MMA. There is an average of 3 double bonds in each polymer chain and are located in the block containing the HEMA.

A 2 liter flask is equipped with a mechanical stirrer, thermometer, nitrogen inlet, drying tube outlet and addition funnels. Z6030, 10.3 g; THF, 19.0 g; MMA, 8.1 g; TRIS, 17.7 g; BDMAMS, 0.5 g; p-xylene, 3.5 g; and TBACB, 400uL of a 1.0M THF solution were charged to the pot. Initiator 1-methoxy-1-trimethylsiloxy-2-methylpropene, 7.1 g was injected. Feed I (TBACB, 810uL and THF, 40.8 g) was started and added over 200 min. After 15 min. Feed II (TRIS, 303.9 g; and BDMAMS, 13.11 g) was added all at once. The TRIS block was polymerized to about 89% after 125 min. and Feed III (THF, 48.3 g; 2-(trimethylsiloxy)ethylmethacrylate, 100.5 g; TBACB, 400uL and BDMAMS, 2.99 g) was started and added over 280 min. The reaction was allowed to stir overnight under nitrogen atmosphere. The next morning, the reaction was quenched with methanol, 80.4 g; water 90.4 g; dichloroacetic acid, 605uL and THF, 763 g. It was refluxed for 4 hours. Then 1302 g of solvent was distilled off while 486 g of toluene was added. The contents of the flask was distilled until the vapor temperature equaled approximately 110° C. alpha-Methylstyrene isocyanate (TMI from American Cyanamid), 22.9 g and dibutyltin dilaurate, 440uL were added and refluxed for 4 hours. This put double bonds at any of the hydroxy-containing sites in the polymer chain. The average number of double bonds in each polymer chain is 2. The polymer solution was then dried in a vacuum oven.

This made a star polymer of TRIS/HEMA//TRIS//Z6030/MMA 8.7/16//70//2.5/2.0 stars with a Mn of 15,000, Mw=37,000.

EXAMPLE 5

TRIS//HEMA/TRIS 75//18/7 Star

This reaction sequence describes the preparation of a star polymer that has arms composed of a random block of TRIS and HEMA and a block of TRIS. The TRIS block is prepared first. There is an average of 2.9 double bonds in each polymer chain and are all located in the block containing the HEMA. The core of the star is formed by the condensation of the initiator groups.

A 2 liter flask is equipped with a mechanical stirrer, thermometer, nitrogen inlet, drying tube outlet and addition fun-nels. TRIS, 150.1 g; THF, 5.9 g; BDMAMS, 2.2 g; p-xylene, 3.5 g; and TBACB, 200uL of a 1.0M THF solution were charged to the pot. Initiator 1-(3-trimethoxylsilyl)propyloxy-1-trimethylsiloxy-2-methylpropene, 6.13 g was injected. Feed I (TBACB, 400uL and THF, 43.5 g) was started and added over 600 min. The TRIS block was polymerized to about 88% conversion after 300 min. At this time, Feed II (THF, 66.8 g; 2-(trimethylsiloxy)ethylmethacrylate, 49.1 g and BDMAMS, 1.3 g) was started and added over 15 min. The reaction was allowed to stir overnight under nitrogen atmosphere. The next morning, the reaction was quenched with methanol, 40.7 g; water 22.3 g; dichloroacetic acid, 220uL and THF, 950 g. It was refluxed for 4 hours. Then 1100 g of solvent was distilled of while 260 g of toluene was added. The contents of the flask was distilled until the vapor temperature equaled approximately 110° C. alpha-Methylstyrene isocyanate (TMI from American Cyanamid), 10.2 g and dibutyltin dilaurate, 200uL were added and refluxed for 4 hours. This put double bonds at any of the hydroxy-containing sites in the polymer chain. The average number of double bonds in each polymer chain is 2. Butanol, 15 g was added and refluxed for 0.5 hour. The polymer solution was then dried in a vacuum oven.

This made a star polymer of TRIS//HEMA/TRIS 75//18/7 with a Mn of 16,600, Mw of 33,800.

EXAMPLE 6

TRIS//HEMA 75//25 Star

This reaction sequence describes the preparation of a star polymer that has arms composed of a block of TRIS and a block of HEMA. The TRIS block is prepared first. There is an average of 2 double bonds in each polymer chain and are all located in the block containing the HEMA. The core of the star is formed by the condensation of the initiator groups. A 2 liter flask is equipped with a mechanical stirrer, thermometer, nitrogen inlet, drying tube outlet and addition funnels. TRIS, 454.3 g; THF, 152.7 g; BDMAMS, 6.3 g; p-xylene, 4.5 g; and TBACB, 900uL of a 1.0M THF solution were charged to the pot. Initiator 1-(3-trimethoxylsilyl)propyloxy-1-trimethylsiloxy-2-methylpropene, 20.28 g was injected. Feed I (TBACB, 600uL and THF, 10.2 g) was started and added over 330 min. The TRIS block was polymerized to about greater than 98% conversion. At this time, Feed II (THF, 306.0 g; 2-(trimethylsiloxy)ethylmethacrylate, 226.3 g;) was started and added over 30 min. The reaction was allowed to stir overnight under nitrogen atmosphere. The next morning, the reaction was quenched with methanol, 101.7 g; water 60.0 g; dichloroacetic acid, 1000uL and THF, 453 g. It was refluxed for 4 hours. Then 340 g of solvent was distilled of while 658 g of toluene was added. The contents of the flask was distilled until the vapor temperature equaled approximately 110° C. alpha-Methylstyrene isocyanate (TMI from American Cyanamid), 18 g and dibutyltin dilaurate, 240uL were added and refluxed for 4 hours. This put double bonds at any of the hydroxy-containing sites in the polymer chain. Butanol, 23 g was added and refluxed for 1 hour. The polymer solution was then dried in a vacuum oven.

This made a star polymer of TRIS//HEMA 75//25 with a Mn of 19,900, Mw of 128,900.

EXAMPLE 7

HEMA//TRIS 17.4//82.6 Star

This reaction sequence describes the preparation of a star polymer that has arms composed of a block of HEMA and a block of TRIS. The TRIS block is prepared first. The core is composed of a polysiloxane material. There is an average of 1.5 double bonds in each polymer chain and are located in the block containing the HEMA.

A 1 liter flask is equipped with a mechanical stirrer, thermometer, nitrogen inlet, drying tube outlet and addition funnels. TRIS, 75.0 g; THF, 25.1 g; p-xylene, 2.0 g; BDMAMS, 1.0 gm; and TBACB, 150uL of a 1.0M THF solution were charged to the pot. Initiator 1-[3-(trimethoxysilyl)propoxyl]-1-trimethylsiloxy-2-methylpropene, 3.34 g was injected. Feed I (TBACB, 100uL and THF, 4.0 g) was started and added over 200 min. After 180 min., the TRIS block was polymerized. Feed II (THF, 50.0 g; 2-(trimethylsiloxy)ethylmethacrylate, 24. g;) was started and added over 10 min. The reaction was allowed to stir overnight under nitrogen atomosphere. The next morning, the reaction was quenched with methanol, 20.0 g; water 11.0 g; dichloroacetic acid, 100uL and THF, 75 g. It was refluxed for 4 hours. Then 280 g of solvent was distilled of while 200 g of toluene was added. The contents of the flask was distilled until the vapor temperature equaled approximately 110° C. alpha-Methylstyrene isocyanate (TMI from American Cyanamid), 3.0 g and dibutyltin dilaurate, 40uL were added and refluxed for 4 hours. This put double bonds at any of the hydroxy-containing sites in the polymer chain. The average number of double bonds in each polymer chain is 1.5. The polymer solution was then dried in a vacuum oven.

This made a star polymer of HEMA//TRIS 17.4//82.6 with a Mn of 19,900, Mw=34,400.

EXAMPLE 8

HEMA//TRIS//Z6030/MMA 35.5//55.6//7.1/1.8 Star

This reaction sequence describes the preparation of a star polymer that has arms composed of a block of HEMA and a block of TRIS. The TRIS block is prepared first. The core is composed of Z6030 and MMA. There is an average of 2.0 double bonds in each polymer chain and are located in the block containing the HEMA.

A 1 liter flask is equipped with a mechanical stirrer, thermometer, nitrogen inlet, drying tupe outlet and additional funnels. Z6030 15.9 g and MMA, 4.0 gm; p-xylene, 2.0 g; and TBACB, 400uL of a 1.0M THF solution were charged to the pot. Initiator 1-methoxy-1-trimethylsiloxy-2-methylpropene, 3.5 g was injected. Feed I (TBACB, 100uL and THF, 4.0 g) was started and added over 200 minutes. After 20 min. Feed II (TRIS, 125.3 g; TBACB, 100uL of a 1.0M THF solution and BDMAMS, 2.0 g) was added over 10 minutes. The TRIS block was polymerized. At 330 minutes into the reaction, Feed III (THF, 99.0 g; 2-(trimethylsiloxy)ethylmethacrylate, 124.0 g) was started and added over 10 min. The reaction was allowed to stir overnight under nitrogen atomosphere. The next morning, the reaction was quenched with methanol, 100.0 g; water, 55.0 g; dichloroacetic acid, 400uL and THF, 150 g. It was refluxed for 4 hours. Then 380 g of solvent was distilled off while 580 g of toluene was added. The contents of the flask was distilled until the vapor temperature equaled approximately 100° C. alpha-Methylstyrene isocyanate (TMI from American Cyanamid), 8.1 g and dibutyltin dilaurate, 100uL were added and refluxed for 4 hours. This put double bonds at any of the hydroxy-containing sites in the polymer chain. The average number of double bonds in each polymer chain is 2. The polymer solution was then dried in a vacuum oven.

This made a star polymer of HEMA//TRIS//Z6030/MMA 35.5//55.6//7.1/1.8 with a Mn of 31,800, Mw=771,000.

EXAMPLE 9

TRIS//HEMA/TRIS 59//30/11 Linear Block Copolymers

This reaction sequence describes the preparation of a linear block copolymer that has a block of 3-methacryloxypropyltris(trimethylsiloxy)silane (TRIS) and a random block containing TRIS and 2-hydroxyethylmethacrylate (HEMA). The TRIS block is prepared first. The double bonds are put in by reaction of hydroxy groups with an isocyanate. There is an average of 4 double bonds in each polymer chain and are located in either/both block.

A 2 liter flask is equipped with a mechanical stirrer, thermometer, nitrogen inlet, drying tube outlet and addition funnels. TRIS, 145.4 g; THF, 48.9 g; bis(dimethylamino)methylsilane (BDMAMS), 2.6 g; p-xylene, 3.g; and tetrabutylammonium m-chlorobenzoate (TBACB), 420uL of a 1.0M THF solution were charged to the pot. Initiator 1-(2trimethylsiloxy)ethoxy-1-trimethylsiloxy-2-methylpropene, 5.61 g was injected. Feed I (TBACB, 420uL and THF, 51.5 g) was started and added over 600 min. The TRIS block was polymerized to about 85% conversion. At this time, Feed II (2-(trimethylsiloxy)ethylmethacrylate, 96.2 g, TBACB, 210uL and BDMAMS, 0.98 g) was started and added over 300 min. The reaction was allowed to stir overnight under nitrogen atomosphere. The next morning, the reaction was quenched with methanol, 80.0 g, water, 90.0 g; dichloroacetic acid, 600uL and THF, 540 g. It was refluxed for 4 hours. Then solvent was distilled off while 200 g of toluene was added. The contents of the flask was distilled until the vapor temperature equaled approximately 110° C. alpha-Methylstyrene isocyanate (TMI from American Cyanamid), 14.8 g and dibutyltin dilaurate, 300uL were added and refluxed overnight. This put double bonds at any of the hydroxy-containing sites in the polymer chain. Butanol, 22 g was added and refluxed for 0.5 hour. The polymer solution was then dried in a vacuum oven.

This made a linear block copolymer of TRIS/-HEMA//TRIS 59//30/11 with a Mn of 17,500

EXAMPLE 10

TRIS/HEMA//TRIS//Z6030/MMA 14.1/18.6//63.6//2.0/1.7 Star

This reaction sequence describes the preparation of a star polymer that has arms composed of a random block of TRIS and HEMA and a block of TRIS. The TRIS block was prepared first. The core is composed of Z6030 and MMA. There is an average of 4.6 double bonds in each polymer chain and are located in the block containing the HEMA.

A 2 liter flask is equipped with a mechanical stirrer, thermometer, nitrogen inlet, drying tube outlet and addition funnels. Z6030, 10.0 g; THF, 20.2 g; MMA, 8.2 g; TRIS, 17.1 g; BDMAMS, 0.5 g; p-xylene, 2.2 g; and TBACB, 405uL of a 1.0M THF solution were charged to the pot. Initiator 1-methoxy-1-trimethylsiloxy-2-methylpropene, 6.88 g was injected. Feed I (TBACB, 810uL and THF, 43.5 g) was started added over 200 min. After 10 min. Feed II (TRIS, 366.6 g; and BDMAMS, 2.91 g) was added all at once. The TRIS block was polymerized to about 81% after 70 min. and Feed III (THF, 52.6 g; 2-(trimethylsiloxy)ethylmethacrylate, 142.5 g; TBACB, 400uL and BDMAMS, 3.05 g) was started and added over 280 min. The reaction was allowed to stir overnight under nitrogen atomosphere. The next morning, the reaction was quenched with methanol, 110.1 g; water 80.5 g; dichloroacetic acid, 860uL and THF, 297 g. It was refluxed for 4 hours. Then solvent was distilled off while 332 g of toluene was added. The contents of the flask was distilled until the vapor temperature equaled approximately 100° C. alpha-Methylstyrene isocyanate (TMI from American Cyanamid), 33.2 g and dibutyltin dilaurate, 660uL were added and refluxed for 4 hours. This put double bonds at any of the hydroxy-containing sites in the polymer chain. The polymer solution was then dried in a vacuum oven.

This made a star polymer of TRIS/HEMA//TRIS//Z6030/MMA 14.1/18.6//63.6//2.0/1.7 star with a Mn of 14,200, Mw=206,000.

EXAMPLE 11

TRIS//HEMA/MMA 60//36.5/3.5 Linear Block Copolymers

This reaction sequence describes the preparation of a linear copolymer comprising a block of 3-methacryloxypropyltris(trimethylsiloxy)silane (TRIS) and a block containing both methyl methacrylate (MMA) and 2-hydroxyethyl methacrylate (HEMA). There is on the average 2 double bonds per polymer chain distributed in the HEMA/MMA block.

A 5 liter flask was equipped with a mechanical stirrer, thermometer, N2 inlet, drying tube outlet and addition funnels. Tetrahydrofuran, 196 g, tetrabutylammonium m-chlorobenzoate, 1.8 mL, bis(dimethylamino)methylsilane, 3.8 g, p-xylene, 9 g and TRIS, 552 g, were charged to the pot. Initiator, 1-trimethylsiloxy-1-methoxy-2-methylpropene, 16.0g was injected and the TRIS block was polymerized. Feed 1 (THF, 20 g and tetrabutylammonium m-chlorobenzoate, 4mL of a 1.0M solution in THF) was then started and added over 200 min. Feed 2 (2-trimethylsiloxy)ethyl methacrylate, 529 g, MMA, 27.6 g, and bis(dimethylamino)methylsilane, 1.3 g) was started at 40 min. after the addition of the initiator. Feed 2 was added over a period of 180 minutes. A total of 220 g of THF was added to reduce the viscosity of the reaction mixture. One hour after the addition of Part 2, the reaction was quenched with methanol, 419 g, water, 236 g, dichloroacetic acid, 0.43 ml and THF, 1168 g. The mixture was refluxed for 4 hours. Solvent, 2200 g was distilled off while 2000 g of toluene was added. The contents of the flask were distilled until the vapor temperature equalled approximately 107° C. Then dibutyltin dilaurate, 0.51 mL, and alpha-methylstyrene isocyanate (TMI from Am. Cyanamid), 34.7 g was added and refluxed for 5 hours. Dried n-butanol, 5.3g, was added and refluxed for 30 min. This puts an average of about 2 double bonds per polymer chain. Another 250 g of solvent was removed and the remaining solution dried in a vacuum oven.

This made a linear block copolymer TRIS//HEMA/MMA 60//36.5/3.5 having an Mn of approximately 10,000.

EXAMPLE 12

TRIS//HEMA/MMA 68//29/3 Linear Block Copolymers

This reaction sequence describes the preparation of a linear copolymer comprising a block of 3-methacryloxypropyltris(trimethylsiloxy)silane(TRIS) and a block containing both methyl methacrylate (MMA) and 2-hydroxyethyl methacrylate (HEMA). There is an average of 2 double bonds per polymer chain distributed in the HEMA/MMA block.

A 12 liter flask was equipped with a mechanical stirrer, thermometer, N2 inlet, drying tube outlet and additional funnels. Tetrahydrofuran, 786 g, tetrabutylammonium m-chlorobenzoate, 6.4mL, bis(dimethylamino)methyl silane, 20.6 g, p-xylene, 32 g and TRIS, 2213 g, were charged to the pot. Initiator, 1-trimethylsiloxy- 1-methoxy-2-methylpropene, 57.2 g, was injected and the TRIS block was polymerized. Feed 1 (THF, 20 g and tetrabutylammonium m-chlorobenzoate, 13mL of a 1.0M solution in THF) was then started and added over 200 min. Feed 2 (2-trimethylsiloxy)ethylmethacrylate, 1472 g, MMA, 92 g and bis(dimethylamino)methylsilane was started at 60 min. after the addition of initiator. Feed 2 was added over a 180 min. period. A total of 3733 g of THF was added to reduce the viscosity of the reaction mixture. One hour after the addition of Part 2, the reaction was quenched with methanol, 769 g, water, 461 g, dichloroacetic acid, 1.0mL. The mixture was then refluxed for 5 hours. Solvent was distilled off while 5000g of toluene was added. The contents of the flask were distilled until the vapor temperature equalled approximately 107° C. Then dibutyltin dilaurate, 2.4mL, and alpha-methylstyrene isocyanate (TMI from American Cyanamid), 137 g was added and refluxed for 5 hours. Dried n-butanol, 15g, was added and refluxed for 15 min. This puts an average of about 2 double bonds per polymer chain. The remaining solution was dried in a vacuum oven.

This made a linear block copolymer TRIS/HEMA/MMA 68//29/3 having an Mn of approximately 10,000.

EXAMPLE 13

TRIS//HEMA/TRIS 63//30/7 Linear Block Copolymers

This reaction sequence describes the preparation of a linear copolymer comprising a block of 3-methacryloxypropyltris(trimethylsiloxy)silane(TRIS) and a block containing both methyl methacrylate (MMA) and 3-methacryloxypropyltris(trimethylsiloxy)silane(TRIS). There is an average of 2 double bonds per polymer chain distributed in the HEMA/TRIS block.

A 5 liter flask was equipped with a mechanical stirrer, thermometer, N2 inlet, drying tube outlet and additional funnels. Tetrahydrofuran, 99.4 g, tetrabutylammonium m-chlorobenzoate, 0,800mL, bis(dimethylamino)methyl silane, 3.87 g, p-xylene, 5.76 g and TRIS, 279.9 g, were charged to the pot. Initiator, 1-trimethylsiloxy-1-methoxy-2-methylpropene, 7.12 g, was injected and the TRIS block was polymerized. Feed 1 (THF, 50 g and tetrabutylammonium m- chlorobenzoate, 1.2mL of a 1.0M solution in THF) was then started and added over a 600 min. period. Feed 2 (2-(trimethylsiloxy)ethyl methacrylate and bis(dimethylamino)methylsilane, 1.79 g) was started at 70 minutes after the addition of initiator. Feed 2 was added over 300 minutes. Twelve hours after the addition of Part 2, the reaction was quenched with methanol, 143 g, water, 56 g, dichloroacetic acid, 0,700mL and THF, 487 g. The mixture was refluxed for 4 hours. The mixture was then refluxed for 4 hours. Solvent was distilled off while 200g of toluene was added. The contents of the flask were distilled until the vapor temperature equalled approximately 107° C. Exactly one-quarter of the contents of the flask was subjected to the following treatment to put pendant double bonds onto the polymer. Dibutyltin dilaurate, 0.090 mL, and alpha-methylstyrene isocyanate (TMI from American Cyanamid), 4.5 g were added and refluxed for 5 hours. Dried n-butanol, 1 g, was added and refluxed for 30 min. This puts an average of about 2 double bonds per polymer chain. The solution was dried in a vacuum oven.

This made a linear block copolymer 63//30/7 having an Mn of approximately 10,00 and Mw=19,000.

EXAMPLES 14-17

The macromonomer of example 1 was combined with hydrophilic monomers as exhibited in Table 3. Specifically, soft contact lenses comprising this macromonomer ranging in weight from 21.5 to 33.5 were copolymerized with mixtures of HEMA, MAA, VP and EGDM in the indicated weight ratios. After mixing the macromonomer and monomers, the mixture was placed in molds under UV light in the absence of oxygen for approximately 1 hour. After removing the buttons from the molds, the copolymers were then machined into contact lenses and hydrated to provide contact lenses ranging in water content from 20 to about 48. The Dk's of these lenses ranged from about 19 to 66 (FATT method).

EXAMPLE 18

The macromonomer of Example 2 was combined with hydrophilic monomers as indicated in Table 3, below. Specifically, soft contact lenses comprising this macromonomer at 33% by weight of the final contact lens copolymer were copolymerized with a mixture of HEMA (33.5%), VP (33.1%) and EGDM (0.4%). After mixing the macromonomer and monomers, the mixture was placed in molds under UV light in the absence of oxygen for approximately 1 hour. After removing the buttons from the molds, the copolymers were then machined into contact lenses and hydrated to provide contact lenses having a water content of about 31. The Dk of these lenses was about 20 (FATT method).

EXAMPLE 19

The star polymer of Example 3 was combined with hydrophilic monomers as indicated in Table 3, below. Specifically, soft contact lenses comprising this star polymer at 27.6% by weight of the final contact lens copolymer were copolymerized with a mixture of HEMA (28%), MAA (16%), VP (28%) and EGDM (0.4%). After mixing the macromonomer and monomers, the mixture was placed in molds under UV light in the absence of oxygen for approximately 1 hour. After removing the buttons from the molds, the copolymers were then machined into contact lenses and hydrated to provide contact lenses having a water content of 20. The Dk of these lenses was about 29 (FATT method).

EXAMPLE 20

The star polymer of Example 7 was combined with hydrophilic monomers as indicated in Table 3, below. Specifically, soft contact lenses comprising this star polymer at 35% by weight of the final contact lens copolymer were copolymerized with a mixture of HEMA (30%), VP (34.8%) and EGDM (0.2%). After mixing the macromonomer and monomers, the mixture was placed in molds under heat (60° C. for 24 hours, followed by 110° C. for 24 hours. After removing the buttons from the molds, the copolymers were then machined into contact lenses and hydrated to provide contact lenses having a water content of 45. The Dk of these lenses was about 67 (FATT method).

EXAMPLE 21

The star polymer of Example 6 was combined with hydrophilic monomers as indicated in Table 3, below. Specifically, soft contact lenses comprising this star polymer at 30% by weight of the final contact lens copolymer were copolymerized with a mixture of VP (69.5%) and EGDM (0.5%). After mixing the macromonomer and monomers, the mixture was placed in molds under UV light for one hour followed by heat (60° C. for 18 hours, fol-lowed by 110° C. for 18 hours. After removing the buttons from the molds, the copolymers were then machined into contact lenses and hydrated to provide contact lenses having a %water of 80. The Dk of these lenses was about 131 (FATT method).

EXAMPLE 22

The star polymer of Example 8 was combined with hydrophilic monomers as indicated in Table 3, below. Specifically, soft contact lenses comprising this star polymer at 33% by weight of the final contact lens copolymer were copolymerized with a mixture of HEMA (33%), VP (34%) and EGDM (0.5%). After mixing the macromonomer and monomers, the mixture was placed in molds under heat and pressure (60° C. for 7 hours, followed by 110° C. for 24 hours). After removing the buttons from the molds, the copolymers were then machined into contact lenses and hydrated to provide contact lenses having a % water of 43. The Dk of these lenses was about 64 (FATT method).

EXAMPLE 23

The star polymer of Example 6 was combined with hydrophilic monomers as indicated in Table 3, below. Specifically, soft contact lenses comprising this star polymer at 49.5% by weight of the final contact lens copolymer were copolymerized with a mixture of HEMA (25%), VP (25%) and EGDM (0.5%). After mixing the macromonomer and monomers, the mixture was placed in molds under UV light for 45 minutes followed by heat (75° C. for 8 hours, followed by 110° C. for 12 hours). After removing the buttons from the molds, the copolymers were then machined into contact lenses and hydrated to provide contact lenses having a water of 17. The Dk of these lenses was about 73 (FATT method).

EXAMPLE 24

The macromonomer of Example 13 was combined with hydroxyethylmethacrylate (HEMA) and methacrylic acid (MAC) (from 0 to 3% by weight) as indicated in Table 3, below. In one example, ethyleneglycol dimethacrylate (EDGMA), 0.5% by weight, was also added. Soft contact lenses comprising this macromonomer (30% by weight of the final contact lens copolymer) were made by copolymerizing a mixture of the above-mentioned monomers (using 3% Irgacure 500 and a Dymax high intensity UV unit as previously described for 30 minutes in polypropylene lens molds. After removing the lenses from the lens molds, the copolymers were then hydrated (0.1M phosphate buffer pH of 7.5-8.0) to provide contact lenses having water cotents ranging from 27% to about 55%. The Dk (normalized for varying thicknesses) of these lenses ranged from 28.5 to 49.1. These results are presented in Table 3, below.

EXAMPLE 25

The macromonomer of Example 12 was combined with hydroxyethylmethacrylate (HEMA) and methacrylic acid (MAC) (from 0 to 8% by weight) as indicated in Table 4, below. Soft contact lenses comprising this macromonomer (30% by weight of the final contact lens copolymer) were made by copolymerizing a mixture of the above-mentioned monomers (using 3% Daracure 1173 and a Dymax high intensity UV unit as previously described for 30 minutes in polypropylene lens molds. After removing the lenses from the lens molds, the copolymers were then hydrated (0.1M phosphate buffer pH of 7.5-8.0) to provide contact lenses having water cotents ranging from 23.4% to about 65%. The Dk (normalized for varying thicknesses) of these lenses ranged from 16.6 to 62.

EXAMPLE 26

The macromonomer of Example 12 was combined with hydroxyethylmethacrylate (HEMA), vinyl pyrrolidone (VP) and ethylene glycol dimethacrylate (EGDMA) as indicated in Table 5, below. In one example lens 2.0% methacrylic acid was added. Soft contact lenses comprising this macromonomer (30% by weight of the final contact lens copolymer) were made by copolymerizing a mixture of the above-mentioned monomers (using 0.5% Daracure 1173 or 0.5% Irgacure 500 and a low intensity UV unit as previously described) for 90 minutes in polypropylene lens molds. After removing the lenses from the lens molds, the copolymers were then hydrated (0.1M phosphate buffer pH of 7.5-8.0) to pro-vide contact lenses having water cotents ranging from 43% to about 62%. The Dk (normalized for varying thicknesses) of these lenses ranged from about 30 to 78.

EXAMPLE 27

The macromonomer of Example 12 was combined with hydroxyethylmethacrylate (HEMA) and methacrylic acid (MAC) (from 0 to 4% by weight) as indicated in Table 6, below. Soft contact lenses comprising this macromonomer (20% or 40% by weight of the final contact lens copolymer) were made by copolymerizing a mixture of the above-mentioned monomers (using 0.5% Daracure 1173 and a low intensity UV unit as previously described) for 90 minutes in polypropylene lens molds. After removing the lenses from the lens molds, the copolymers were then hydrated (0.1M phosphate buffer pH of 7.5-8.0) to provide contact lenses having water cotents ranging from about 20% to about 59%. The Dk (normalized for varying thicknesses) of these lenses ranged from 21.3 to about 81.

EXAMPLE 28

The macromonomer of Example 12 was combined with hydroxyethylmethacrylate (HEMA), methacrylic acid (MAC) and N-isobutoxymethylacrylamide (IBMA) as indicated in Table 7, below. Soft contact lenses comprising this macromonomer (20-30% by weight of the final contact lens copolymer) were made by copolymerizing a mixture of the above-mentioned monomers (using 3.0% Daracure 1173 and a high intensity UV unit as previously described) for about 30 minutes on polypropylene film molds. After removing the films from the film molds, the copolymers were then hydrated (0.1M phosphate buffer pH of 7.5-8.0) to provide contact lenses having water cotents ranging from about 50% to about 60%. The Dk (normalized for varying thicknesses) of these lenses ranged from 29.8 to about 130.

I. Comparison of Conventional Soft Lenses and Lenses of the Present Invention Conventional soft lenses are generally copolymers of hydrophilic monomers such as hydroxyethyl methacrylate, methacrylic acid and N-vinyl pyrrolidone. The following Table I gives the literature value of oxygen permeabilities versus water content of convention soft lenses. As indicated, permeabilities increase as a function of an increase in water content.

Table 1

Literature Value of Water Content vs. Permeability

The following represents the calculated Dk of a series of standard hydrophilic contact lens materials at the indicated water content. The true Dk for different water content soft contact lens materials follows the general equation:

$$Dk = 2 \times e^{0.041 \times \text{water content}}$$

| Water Content | True Dk | $\left( \times 10^{-11} \dfrac{cm^3 \, cm}{s \, cm^2 \, mm \, Hg} \right)$ |
|---|---|---|
| 20 | 4.54 | |
| 25 | 5.57 | |
| 30 | 6.84 | |
| 35 | 8.39 | |
| 40 | 10.31 | |
| 45 | 12.65 | |
| 50 | 15.53 | |
| 55 | 19.07 | |
| 60 | 23.40 | |
| 65 | 28.73 | |
| 70 | 35.27 | |
| 75 | 43.29 | |
| 80 | 53.15 | |
| 85 | 65.24 | |

Table 1 tracks the composition, water content and permeabilities of some conventional soft contact lenses.

Tables 2-7

Soft Contact Lenses According to the Present Invention

The addition of pre-formed silicone containing polymers improves the permeability vs the water content of soft lenses. The following Tables 2-7 gives the properties of lenses made with block, linear polymers and star polymers. As can be seen from these results, the inclusion of these polymers dramatically improves the permeabiity of lenses at comparable water contents. Many of these lenses are drapeable and exhibit favorable additional characteristics as well.

TABLE 2

Permeability vs Water Content for Lenses Made with Macromonomers and Star Polymers

| Lens Ex. | Composition | | | | | % Water | PERM. Dk ($\times 10^{-11}$) |
|---|---|---|---|---|---|---|---|
| | Poly. | HEMA | MAC | VP | EGDM | | |
| 14 | 33 | 33.5 | — | 33 | 0.5 | 39 | 45 |
| 15 | 33 | 20 | — | 46.6 | 0.4 | 48 | 66 |
| 16 | 27.6 | 28 | — | 28 | 0.4 | 20 | 19 |
| 17 | 21.5 | 36.9 | 41.3 | — | 0.3 | 26 | 24 |
| 18 | 33 | 33.5 | — | 33.1 | 0.4 | 31 | 20 |
| 19 | 27.6 | 28 | 16 | 28 | 0.4 | 20 | 29 |
| 20 | 35 | 30 | — | 34.8 | 0.2 | 45 | 67 |
| 21 | 30 | — | — | 69.5 | 0.5 | 80 | 131 |
| 22 | 33 | 33 | — | 34 | 0.5 | 43 | 64 |
| 23 | 49.5 | 25 | — | 25 | 0.5 | 17 | 73 |

TABLE 3

Permeability vs Water Content for Lenses Made with Macromonomers As Set Forth in Example 24

| Macromonomer | HEMA | MAC | EGDMA | $H_2O$ Content | True Dk |
|---|---|---|---|---|---|
| 30 | 70 | 0 | — | 33 | 29 |
| 30 | 69 | 1 | — | 27 | 28 |
| 30 | 68 | 2 | — | 43.8 | 43 |
| 30 | 66.5 | 3 | 0.5 | 55 | 49 |

TABLE 4

Permeability vs Water Content for Lenses Made with Macromonomers As Set Forth in Example 25

| Macromonomer | HEMA | MAC | $H_2O$ Content | True Dk |
|---|---|---|---|---|
| 30 | 70 | 0 | 23.4 | 17 |
| 30 | 68 | 2 | 40.6 | 34 |
| 30 | 66 | 4 | 51.9 | 54 |
| 30 | 64 | 6 | 59 | 52 |
| 30 | 66 | 8 | 65 | 62 |

TABLE 5

Permeability vs Water Content for Lenses Made with Macromonomers As Set Forth in Example 26

| Macromonomer | VP | HEMA | MAC | EGDMA | $H_2O$ Cont. | True Dk |
|---|---|---|---|---|---|---|
| 30 | 49.5 | 20 | — | 0.5 | 47.5 | 30 |
| 30 | 69.5 | — | — | 0.5 | 62 | 78 |
| 30 | 32.8 | 34.8 | 2 | 0.5 | 43 | 38 |

TABLE 6

Permeability vs Water Content for Lenses Made with Macromonomers As Set Forth in Example 27

| Macromonomer | HEMA | MAC | $H_2O$ Content | True Dk |
|---|---|---|---|---|
| 20 | 80 | 0 | 27 | 21 |
| 20 | 78 | 2 | 45.5 | 31 |
| 20 | 76 | 4 | 58.5 | 81 |
| 40 | 80 | 0 | 20 | 24 |

TABLE 7

Permeability vs Water Content for Films Made with Macromonomers As Set Forth in Example 28

| Macromonomer | HEMA | MAC | IBMA | $H_2O$ Content | True Dk |
|---|---|---|---|---|---|
| 20 | 51 | 6 | 20 | 52 | 30 |
| 25 | 46 | 6 | 20 | 55 | 50 |
| 30 | 41 | 6 | 20 | 60 | 130 |

The results of the incorporation of silicon-containing pre-formed acrylic copolymers according to the present invention into soft lens polymer matrices evidenced surprisingly enhanced gas permeability (Tru Dk- measured Dk normalized for thickness variation) relative to the gas permeability of conventional contact lenses. For a given water content, the lenses of the present invention exhibited oxygen permeabilities which were generally at least about 1.5-2 times the permeabilities exhibited by the conventional lens. As can be seen from these results the inclusion of these polymers dramatically improves the permeability of lenses at comparable water contents. In addition, many of these lenses are drapeable and exhibit toughness/durability as well. Moreover, many of these lenses are optically clear, having light transmissions approaching 100% (>95%).

This invention has been described in terms of specific embodiments set forth in detail herein, but it should be understood that these are by way of illustration and the invention is not necessarily limited thereto. Modifications and variations will be apparent from the disclosure and may be resorted to without departing from the spirit of the inventions those of skill in the art will readily understand. Accordingly; such variations and modifications are considered to be within the purview and scope of the invention and the following claims.

What is claimed is:

1. A composition comprising at least about 10% by weight of at least one preformed silicone-containing acrylic copolymer and no more than about 90% by weight of a matrix formed from the polymerization of a mixture of monomers in combination with said preformed acrylic copolymer, said mixture of monomers or said preformed copolymer derived from an amount of hydrophilic monomer effective to provide a final composition which upon hydration comprises at least about 10% by weight water, said preformed acrylic copolymer being dispersed or copolymerized throughout said matrix.

2. A composition comprising about 10% to about 98% by weight of at least one preformed silicone-containing acrylic copolymer and about 2% to about 90% by weight of a matrix formed from the random polymerization of a mixture of monomers in combination with said preformed acrylic copolymer, said preformed acrylic copolymer comprising at least one hydrophilic block and at least one hydrophobic, permeable block comprising at least about 50% by weight of silicone acrylate units, said mixture of monomers comprising at least one hydrophilic monomer in an amount effective to provide a composition which comprises at least about 10% by weight water after hydration, said preformed silicone-containing acrylic copolymer being copolymerized throughout said matrix.

3. The composition according to claim 2 wherein said preformed acrylic copolymer is a linear diblock macromonomer which comprises a hydrophilic block comprising about 10% to about 90% by weight of said preformed copolymer and said hydrophobic, permeable block comprises about 10% to about 90% by weight of said copolymer, said hydrophobic, permeable block comprising at least about 50% by weight silicon acrylate units, said preformed silicone-containing copolymer comprising about 10% to about 98% by weight of said composition, said mixture of monomers comprising at least one hydrophilic monomer in an amount sufficient to provide a composition which comprises at least about 10% by weight water after hydration.

4. The composition according to claim 2 wherein said silicone acrylate has the generate formula:

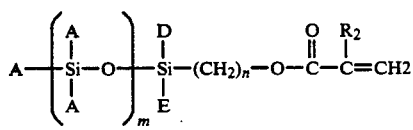

where A is selected from the group consisting of C1–C5 alkyl groups, phenyl groups, and G groups;
G is a group of the structure:

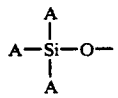

D and E are selected from the group consisting of C1–C5 alkyl groups, phenyl groups and G groups; m is an integer from one to five, except where A, D and E are $C_1$ alkyl groups, m is an integer from 1 to 15; $R_2$ is H or $CH_3$ and n is an integer from one to three.

5. The composition according to claim 4 wherein said silicone acrylate is TRIS(trimethylsiloxy)-3-methacryloxypropylsilane.

6. The composition according to claim 4 wherein said hydrophilic block comprises units of hydrophilic monomers selected from the group consisting of hydroxyethyl methacrylate, glycerol methacrylate, methacrylic acid and mixtures thereof.

7. The composition according to claim 3 wherein said matrix further comprises a crosslinking monomer in an amount ranging from about 0.05% to about 3.0% by weight of said matrix.

8. The composition according to claim 7 wherein said crosslinking monomer is selected from the group consisting of ethylene dimethacrylate, tetraethyleneglycol dimethacrylate (TEGMA), ethylene glycol dimethacrylate (EGMA), trimethylolpropanetrimethacrylate (TMPTMA), triethyleneglycol dimethacrylate and mixtures thereof.

9. The composition according to claim 3 wherein said matrix about 60% to about 80% by weight of said composition.

10. The composition according to claim 3 wherein said hydrophilic monomer is selected from the group consisting of methacrylic acid, N-vinyl pyrrolidone, glycerol-methacrylate, hydroxyethyl methacrylate, and mixtures thereof.

11. The composition according to claim 3 wherein said hydrophilic block consists essentially of hydrophilic (meth)acrylic monomer units.

12. The composition according to claim 3 wherein said hydrophilic block is a random copolymer block which consists essentially of monomer units derived from a mixture of hydroxyethyl methacrylate and a minor amount of a silicon acrylate.

13. The composition according to claim 3 wherein said hydrophilic block is a random copolymer block which consists essentially of monomer units derived from a mixture of hydroxyethyl methacrylate and a minor amount of methyl methacrylate.

14. The composition according to claim 3 wherein said preformed acrylic copolymer is a linear diblock macromonomer and wherein said hydrophobic, permeable block consists essentially of 3-methacryoxypropyl-tris-(trimethyl siloxy)silane units.

15. The composition according to claim 3 wherein said hydrophilic block comprises about 10% to about 80% by weight of said preformed copolymer and said hydrophobic, permeable block comprises about 90% to about 20% by weight of said preformed copolymer.

16. The composition according to claim 3 wherein said macromonomer before said polymerization contains a pendant organo group derived from alpha-methylstyrene isocyanate by reacting said isocyanate with a hydroxyl group in said macromonomer, said pendant organo group further containing a polymerizable double bond.

17. The composition according to claim 16 wherein said macromonomer has a number average molecular weight of from about 5,000 to about 15,000.

18. The composition according to claim 3 wherein said hydrophilic block contains at least about 20% to 100% by weight of hydrophilic monomer units.

19. The composition according to claim 18 wherein said macromonomer contains at least one pendant organo group substituent containing a copolymerizable carbon-carbon double bond.

20. The composition according to claim 19 wherein said macromonomer contains about 2 to 4 of said pendant organo groups.

21. The composition according to claim 18 wherein said hydrophilic block comprises units of hydrophilic monomers selected from the group consisting of hydroxyethyl methacrylate, glycerol methacrylate, methacrylic acid, and mixtures thereof, said hydrophilic block optionally comprising minor amounts of units of methyl methacrylate, 3-methacryloxypropyl-tris-(trimethylsiloxy)silane or mixtures thereof.

22. The composition according to claim 21 wherein said hydrophilic block contains on average about 1 to about 2 of said pendant organo groups.

23. The composition according to claim 22 wherein said hydrophilic block is comprised of a mixture of monomers of hydroxyethyl methacrylate and methyl methacrylate.

24. The composition according to claim 23 wherein said mixture of monomers of said matrix is selected from a mixture of hydroxyethyl methacrylate and methacrylic acid or a mixture of N-vinylpyrrolidone and hydroxyethyl methacrylate.

25. The composition according to claim 19 wherein said pendant organo group is a methacryloxy, acryloxy, styrenic or allylic group attached to the block copolymer by a urethane, ester, ether or amide linkage.

26. The composition according to claim 2 wherein said preformed acrylic copolymer is an an acrylic star copolymer comprising a crosslinked core derived from one or more (meth)acrylate monomer(s) and attached to the core at least 5 linear polymeric arms with unattached free ends each of said arms comprising at least one substantially hydrophilic block comprising about 10% to about 90% by weight of said arm(s) and at least one substantially hydrophobic, permeable block comprising at least about 50% by weight of said hydrophobic block of at least one or more polysiloxanylalkyl esters of (meth)acrylic acid, said hydrophobic block comprising about 10% to about 90% by weight of said arm(s), said copolymer containing at least one polymerizable double bond in a pendant organo group attached to said hydrophilic block.

27. The composition according to claim 26 wherein said star copolymer comprises:
a. a crosslinked core comprising a polymer derived from a mixture of monomers comprising:
i. about 1-100% by weight of one or more monomers, each monomer having at least two polymerizable groups,

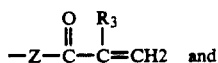

ii. about 9-99% by weight of one or more monomers, each having one group,

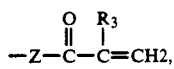

in which $R_3$ is the same or different and is H, $CH_3$, $CH_3$, $CH_2$, CN, or COR' and Z is O, or NR', R' is C1-C4 alkyl and
b. attached to said core (a), at least one polymeric arms, each arm having an unattached free end and comprising a substantially hydrophilic block formed in each arm away from said core comprising about 10% to about 90% by weight of each of said arms and a substantially hydrophobic, permeable block, said hydrophilic block comprising at least about 25% by weight of a hydrophilic acrylic-type monomer and said hydrophobic, permeable block comprising at least about 50% by weight of at least one or more silicone acrylate.

28. The composition according to claim 27 wherein said silicone acrylate has the general formula:

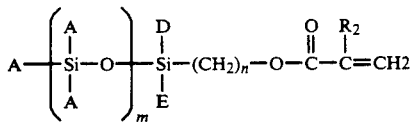

where A is selected from the group consisting of C1–C5 alkyl groups, phenyl groups, and G groups;
G is a group of the structure:

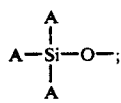

D and E are selected from the group consisting of C1–C5 alkyl groups, phenyl groups and G groups; m is an integer from one to five, except where A, B and E are $C_1$ alkyl groups, m is an integer from 1 to 15; $R_2$ is H or $CH_3$ and n is an integer from one to three.

29. The composition according to claim 27 wherein said core is derived from ethylene glycol dimethacrylate, and said substantially hydrophilic block is derived from a mixture of monomers selected from the group consisting of hydroxyethyl methacrylate, glycerol methacrylate, methacrylic acid and mixtures thereof, said hydrophilic block optionally comprising minor amounts of monomeric methyl methacrylate or silicone acrylate units and said hydrophobic, permeable block consists essentially of silicone acrylate monomeric units.

30. The composition according to claim 27 wherein said core is derived from ethylene glycol dimethacrylate, and said substantially hydrophilic block is derived from a mixture of monomers selected from the group consisting of hydroxyethyl methacrylate, glycerol methacrylate, methacrylic acid and mixtures thereof, and optionally, minor amounts of methyl methacrylate or a silicone acrylate and said hydrophobic, permeable block consists essentially of a silicone acrylate.

31. The composition according to claim 30 wherein said silicone acrylate is 3-methacryloxypropyl-tris-(trimethylsiloxy)silane.

32. The composition according to claim 29 wherein the pendant organo group containing said polymerizable double bond is derived from alpha-methylstyrene isocyanate by reacting said isocyanate with a hydroxyl group in said hydrophilic block.

33. The composition according to claim 29 wherein said terminal organo group is a methacryloxy, acryloxy, styrenic or allylic group attached to an arm by a urethane, ester, ether or amide linkage.

34. The composition according to claim 26 wherein said hydrophilic block comprises about 5% to about 90% by weight of said star copolymer and said hydrophobic, permeable block comprises about 10% to about 95% by weight of said star copolymer.

35. The composition according to claim 27 wherein said mixture of monomers is a mixture of hydroxyethyl methacrylate and methacrylic acid or a mixture of hydroxyethyl methacrylate and N-vinylpyrrolidone.

36. The composition according to claim 27 wherein the hydrophilic block is derived from a monomer or mixtures of monomers selected from the group consisting of hydroxyethyl methacrylate, glycerol methacrylate, methacrylic acid and mixtures thereof, said block optionally comprising minor amounts of methyl methacrylate and silicone acrylate units.

37. The composition according to claim 36 wherein the hydrophilic block is at the terminal end of the arms.

38. The composition according to claim 27 wherein said silicone acrylate is 3-methacryloxypropyl-tris-(trimethyl siloxy)silane.

39. The composition according to claim 29 wherein said star copolymer contains an average of from 1 to 4 pendant organo groups per molecule, each pendant group containing a copolymerizable carbon-carbon double bond.

40. The composition according to claim 39 wherein said pendant organo groups containing said polymerizable double bond are derived from alpha-methylstyrene isocyanate by reacting said isocyanate with a hydroxyl group in said hydrophilic block.

41. The composition according to claim 3 wherein m is an integer from 1 to 4.

42. The composition according to claim 3 wherein said mixture of monomers includes a silicone acrylate.

43. The composition according to claim 42 wherein said silicone acrylate is TRIS(trimethylsiloxy-3-methacryloxypropylsilane.

44. The composition according to claim 2 wherein said preformed acrylic copolymer is an an acrylic star copolymer comprising a polysiloxy crosslinked core and attached to the core at least 5 linear polymeric arms with unattached free ends, each of said arms core comprising one substantially hydrophilic block formed in the end of said arm away from said core comprising about 10% to about 90% by weight of each of said arms, each of said arms also comprising one substantially hydrophobic, permeable block formed at the end of said arm attached to said core comprising units derived from one or more polysiloxanylalkyl esters of (meth)acrylic acid comprising about 10% to about 90% by weight of each of said arm, each of said arms being attached to at least one silicon atom of the polysiloxy core by means of a chemical bond between a carbon atom in said arm and said silicon atom in said core.

45. A contact lens manufactured from a composition comprising about 10% to about 98% by weight of at least one preformed silicone-containing acrylic copolymer and about 2% to about 90% by weight of a matrix formed from the random polymerization of a mixture of monomers in combination with said preformed acrylic copolymer, said preformed acrylic copolymer comprising at least one hydrophilic block and at least one hydrophobic, permeable block, said mixture of monomers comprising at least one hydrophilic monomer in an amount effective to provide a composition which comprises at least about 10% by weight water after hydration, said preformed silicone-containing acrylic copolymer being copolymerized throughout said matrix.

46. The contact lens according to claim 45 wherein said pre-formed acrylic copolymer is a linear diblock macromonomer which comprises a hydrophilic block comprising about 0% to about 90% by weight of said preformed copolymer and said hydrophobic, permeable block comprises about 10% to about 100% by weight of said copolymer, said hydrophobic, permeable block comprising at least about 50% by weight of a silicon acrylate.

47. A contact lens manufactured from the composition according to any one of claims 4-44.

* * * * *